United States Patent [19]

Ando

[11] Patent Number: 5,809,294
[45] Date of Patent: Sep. 15, 1998

[54] PARALLEL PROCESSING UNIT WHICH PROCESSES BRANCH INSTRUCTIONS WITHOUT DECREASED PERFORMANCE WHEN A BRANCH IS TAKEN

[75] Inventor: Hideki Ando, Hyogo-ken, Japan

[73] Assignee: Mitsubishi Denki Kabushiki Kaisha, Tokyo, Japan

[21] Appl. No.: 594,358

[22] Filed: Jan. 30, 1996

Related U.S. Application Data

[63] Continuation of Ser. No. 910,885, Jul. 10, 1992, abandoned.

[30] Foreign Application Priority Data

Jul. 12, 1991 [JP] Japan .................................. 3-172203

[51] Int. Cl.[6] ...................................................... G06F 9/38
[52] U.S. Cl. .......................... 395/580; 395/581; 395/582; 395/584; 395/586; 364/DIG. 1
[58] Field of Search ..................... 395/580, 581, 395/584, 586, 582; 364/DIG. 1

[56] References Cited

U.S. PATENT DOCUMENTS

| | | | |
|---|---|---|---|
| 4,409,654 | 10/1983 | Wada et al. ............................. | 395/375 |
| 4,755,966 | 7/1988 | Lee et al. . | |
| 4,833,599 | 5/1989 | Colwell et al. ......................... | 395/375 |
| 4,858,105 | 8/1989 | Kuriyama et al. ...................... | 364/200 |
| 4,912,635 | 3/1990 | Nishimukai et al. ................... | 395/375 |
| 4,977,496 | 12/1990 | Onishi et al. ........................... | 395/375 |
| 5,050,068 | 9/1991 | Dollas et al. ........................... | 395/375 |
| 5,125,083 | 6/1992 | Fite et al. ................................ | 395/375 |
| 5,136,697 | 8/1992 | Johnson ................................... | 395/375 |
| 5,142,630 | 8/1992 | Ishikawa ................................. | 395/375 |
| 5,185,869 | 2/1993 | Suzuki .................................... | 395/375 |
| 5,261,063 | 11/1993 | Kohn et al. .............................. | 395/375 |
| 5,265,213 | 11/1993 | Weiser et al. ........................... | 395/375 |
| 5,287,467 | 2/1994 | Blaner et al. ........................... | 395/375 |
| 5,333,280 | 7/1994 | Ishikawa et al. ....................... | 395/375 |
| 5,394,529 | 2/1995 | Brown, III et al. .................... | 395/375 |
| 5,440,704 | 8/1995 | Itomitsu et al. ........................ | 395/375 |

FOREIGN PATENT DOCUMENTS 2-130634  5/1990  Japan .

OTHER PUBLICATIONS

Japanese Office Action.

Low–Level Parallel Processing Algorithms for the SIMP Processor Prototype, Feb. 2, 1989, JSPP 89.

Hwang, K.; Briggs F.A.: Computer Architecture and Parallel Processing, New York, etc.: McGraw–Hill Book Company, 1984, pp. 187–193.

German Office Action dated Feb. 13, 1997 and translation thereof.

"The i960 Super Scaler Implementation of the 80960 Architecture" by S. McGready, 1990 IEEE, pp. 232–240.

"A VLSI RICS" by D.A. Patterson et al., Computer, Sep. 1982 pp. 8–20.

(List continued on next page.)

*Primary Examiner*—Alpesh M. Shah
*Assistant Examiner*—Dzung C. Nguyen
*Attorney, Agent, or Firm*—McDermott, Will & Emery

[57] ABSTRACT

A parallel processing unit operable in a delayed branch method has a branch-delay slot filled with instructions to be executed when a branch by a branch instruction is taken. The instructions in the branch-delay slot are those fetched in a period from fetching of the branch instruction till the execution of the branch instruction. Instructions are prefetched from an instruction memory into a queue memory. The queue memory includes a plurality of blocks of storage units. Instructions in the same block as a branch instruction and subsequent to the branch instruction, and instructions in the block adjacent to the block including the branch instruction provide the branch delay slot for the branch instruction. A parallel processing unit operable in a predicted branch method includes a queue memory including a plurality of entries, each of which includes an instruction and a flag indicating that an associated instruction is executed according to a prediction of a branch. This flag is utilized to control execution and non execution of an associated instruction.

25 Claims, 27 Drawing Sheets

OTHER PUBLICATIONS

"Computer Architecture: A Quantative Approach", by J.L. Hennessy et al, Morgan Kaufman Publishers, Inc.

"Machine Organization of the IBM RISC System/6000 Processor", G.F. Grohoski, IBM Journal of Research and Development, vol. 34, No. 1., Jan. 1990, pp. 37–58.

Gurindar S. Sohi, "Instruction Issue Logic for High–Performance Interruptible, Multiple Functional Unit, Pipelined Computers", IEEE Transactions on Computers, vol. 39, No. 3 (Mar. 1990), pp. 349–359.

Kane, "MIPS R2000 RISC Architecture", 1987, pp. 1–1 to 4–11 and A(1–9).

Pawlovsky et al, "A Concurrent Fault Detection Method for Superscalar Processors", IEEE Jan. 1992, pp. 134–144.

FIG. 19

| TAKEN | NOT TAKEN | BR BLOCK :: QT-BLOCK | QUEUE-TOP NEXT CYCLE | QUEUE-TOP NEXT AFTER NEXT CYCLE | SCOPE | ISSUE-STOP |
|---|---|---|---|---|---|---|
| 0 | 0 | X | QUEUE-TOP +4 | * | SCOPE + ISSUE-COUNT | 0 |
| 1 | X | 1 | QUEUE-TOP +4 | — | SCOPE + ISSUE-COUNT | 0 |
| 1 | X | 0 | BR-BLOCK ## $0^2$ + 8 | QUEUE-TOP | SCOPE + ISSUE-COUNT | 0 |
| X | 1 | 1 | QUEUE-TOP +4 | — | BR-BLOCK ## $0^2$ + 8 | 1 |
| X | 1 | 0 | QUEUE-TOP +4 | — | BR-BLOCK ## $0^2$ + 8 | 0 |

X : ARBITRARY          * — NOT SPECIFIED

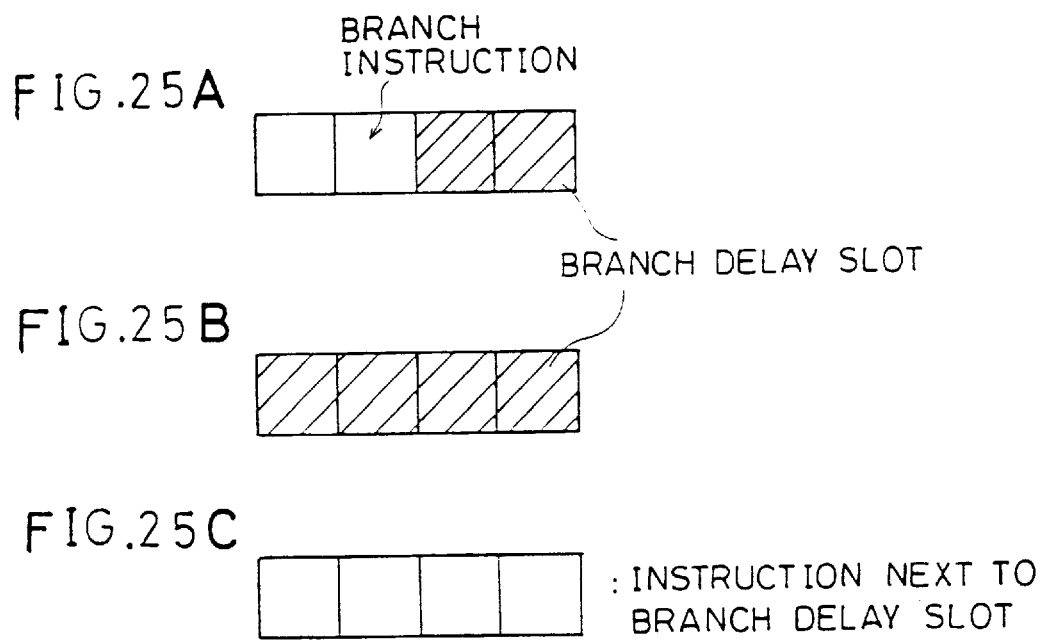

FIG. 30

| INPUT | | | | | | | | OUTPUT | | |
|---|---|---|---|---|---|---|---|---|---|---|
| REGISTER NUMBER FOR STORING LOAD DATA=i *ISSUE-LOAD | ON-PRED | MEM-LOAD-COMPLETE | PRED-HIT | PRED-MIS | RF-LKF-PRED<i> | RF-LKF<i> | RF-LKF-WE<i> | RF-LKF-PRED<i> | RF-LKF-PRED-WE<i> | RF-LKF-PRED-RESET |
| 1 | 0 | x | x | x | x | 1 | 1 | 0 | 1 | 0 |
| 1 | 1 | x | x | x | x | 1 | 1 | 1 | 1 | 0 |
| 0 | x | x | 0 | x | x | x | 0 | x | 0 | 0 |
| 0 | x | x | 0 | 0 | x | 0 | 1 | 0 | 1 | 0 |
| 0 | 1 | 0 | 1 | x | x | x | 0 | x | 0 | 1 |
| 0 | 1 | 0 | x | 1 | 0 | x | 0 | x | 0 | 1 |
| 0 | 1 | 0 | x | 1 | 1 | 0 | 1 | x | 0 | 1 |

PARALLEL PROCESSING UNIT WHICH PROCESSES BRANCH INSTRUCTIONS WITHOUT DECREASED PERFORMANCE WHEN A BRANCH IS TAKEN

This application is a continuation of application Ser. No. 07/910,885 filed Jul. 10, 1992 now abandoned.

BACKGROUND OF THE INVENTION

1. Field of the Invention

The present invention relates generally to branch instruction processing methods and arrangements in parallel processing units.

2. Description of the Background Art

In a pipeline computer, instructions already in the pipeline are usually invalidated when a branch is taken. Such invalidating of instructions dispatched in the pipeline deteriorates the performance of the pipeline computer. For a better understanding of this situation, a processor including a five-stage pipeline as follows is to be considered.

IF: instruction fetch is made.

ID: instruction decode, reading from a register file, and a branch instruction are executed.

EXC: an operation is conducted using an ALU (Arithmetic and Logic Unit).

MEM: a memory (data memory) is accessed.

WB: writing of data into the register file is executed.

An operation of a pipeline when a branch is taken is illustrated in FIG. 1. When a branch does not exist, the pipeline sequentially executes given instructions. Therefore, instructions enter into the pipeline in the order of instructions i, i+1, i+2, i+3, . . . Assume that the instruction i+1 is a branch instruction. Whether or not a branch is actually taken by the instruction i+1 is not known until the end of the ID stage. Therefore, when the instruction i+1 enters the ID stage at time (cycle) T+2, the next instruction i+2 naturally enters the IF stage.

If it is known at the end of time T+2 that a branch is taken in accordance with the branch instruction i+1, the instruction to be executed next is not the instruction i+2 but a branch target instruction. Therefore, at this time (at the end of time T+2), the instruction i+2 is canceled. Assuming that the branch target instruction is an instruction j, the instruction j enters the IF stage at time T+3. More specifically, when a branch is taken, a time period of 1 clock during which no instruction is processed is generated to the pipeline. This empty time period of 1 clock in the pipeline degrades the processing speed of the processor, and the deterioration of the performance results.

Usually in an RISC (Reduced Instruction Set Computer), such deterioration of the performance by a branch instruction is prevented by the use of a delayed branch method. In delayed branch, instructions already in the pipeline when a branch is taken are not invalidated. In the case of delayed branch in which a time period with emptiness generated in the pipeline due to a branch being taken (branch delay) is "1" cycle, instructions are executed in the order:

BRANCH INSTRUCTION,
<INSTRUCTION>, and
BRANCH TARGET INSTRUCTION

The part of <instruction> is referred to as a branch-delay slot. The instruction of branch-delay slot is executed regardless of the presence or absence of a branch. Therefore, a compiler should form a branch slot by moving an instruction so that the result of execution is correct.

An instruction which can be moved to a branch-delay slot is shown in FIG. 2. In FIG. 2, each branch instruction is designated with "IF . . . THEN", and its branch target is shown by an arrow.

In FIG. 2(A), an instruction "R1←R2+R3" is moved to a delay slot. The instruction "R1←R2+R3" is executed regardless of the presence or absence of a branch by a branch instruction, and can therefore be moved to the branch delay slot unconditionally.

In the case of FIG. 2(B), when the branch target of a branch instruction is an instruction "R4←R5–R6", this instruction "R4←R5-R6" is moved to a delay slot. The instruction "R4←R5–R6" in the delay slot is executed even if no branch is taken, and, therefore, it must be guaranteed that a correct result is obtained even in the event no branch is taken.

In FIG. 2(C), the instruction "R4←R5–R6" next to the delay slot is moved into the delay slot. In this case, the instruction "R4←R5–R6" is originally an instruction which is not executed when a branch is taken, and, therefore, it must be guaranteed that a correct result is also provided even when a branch is taken.

Now, a description of a superscalar follows. The superscalar is a processor including the characteristic features of:

(1) fetching a plurality of instructions;
(2) having a plurality of function units and executing a plurality of instructions at a time; and
(3) detecting simultaneously executable instructions out of the fetched plurality of instructions and dispatching these simultaneously executable instructions to associated function units.

A general structure of a superscalar is illustrated in FIG. 3. In FIG. 3, the superscalar includes an instruction memory 1 for storing instructions, an instruction fetch stage (IF stage) 2 for transmitting to instruction memory 1 the addresses of instructions to be fetched, an instruction decode stage (ID stage) 3 for executing decoding of the fetched plurality of instructions, reading from a register file (not shown), and branch instructions, function units 4a, 4b, 6, and 7 each for executing a prescribed operation, and a data memory 8 for storing data.

Instruction decode stage 3 also detects simultaneously executable instructions out of the decoded plurality of instructions, and dispatches these simultaneously executable instructions into function units 4a, 4b, 6, and 7.

Function units 4a and 4b execute integer addition, etc. Function unit 6 executes loading or storing of data from/into data memory 8. Function unit 7 executes floating point addition, etc.

Function units 4a, 4b, 6, and 7 each include a plurality of pipelined stages. Function units 4a and 4b includes an execution stage EXC for executing a given instruction, and a register file writing stage WB for writing the result of the execution into a register file (not shown). Function unit 6 includes an address calculation stage ADR for calculating an address to access data memory 8 from the given instruction, a memory access stage MEM for accessing data memory 8 in accordance with the calculated address, and a register file writing stage WB for writing data loaded from data memory 8 into the register file.

Function unit 7 includes three execution stages EXC1, EXC2, and EXC3, and a register file writing stage WB for writing the result of the execution into the register file. In the superscalar, as shown in FIG. 3, a plurality of instructions are simultaneously fetched from instruction memory 1, and a plurality of instructions are executed in parallel to each other in function units 4a, 4b, 6, and 7, and, therefore, an improved processing speed is provided as compared to a usual processor having only one pipeline.

An operation of a pipeline when a branch is taken in a superscalar is shown in FIG. 4. In FIG. 4, an operation of the pipeline in the superscalar by which two instructions are fetched at a time and maximum two integer operations can be executed simultaneously is illustrated. Assume that an instruction i+3 is a branch instruction and it is known when the instruction i+3 has reached the ID stage (instruction decode stage) that a branch is taken. At this time, instructions i+4 and i+5 are already in the IF stage (instruction fetch stage). These instructions i+4 and i+5 are canceled when the generation of the branch is known.

A branch target instruction, instruction j is started from time (cycle) T+3.

As shown in FIG. 4, in the superscalar, a plurality of instructions are executed at a time, a plurality of instructions to be canceled exist, and greater effects are given on the performance as compared to a processor including only one pipeline.

If a delayed branch method in which a branch delay slot is dispatched after this branch instruction is employed, a plurality of instructions should be provided as branch delay slots.

According to the recitation of "Computer Architecture: A Quantitative Approach" by J. Hennessy, D. A. Patterson, P. 276, FIG. 6. 22, the probability that a branch delay slot will be filled by an instruction moved by a compiler is about 50%. NOP instructions, etc. are usually inserted into branch delay slots which can not be filled by a significant instruction. Therefore, in a superscalar in which a plurality of branch delay slots exists, the probability that all the branch delay slot are filled with moved instructions would be very low.

Also in the superscalar, instructions which can be moved to branch delay slots can be moved for execution together with other instructions as simultaneously executable instructions, before being used to fill the branch delay slots. Accordingly, in the superscalar, it is difficult to improve its performance in accordance with a conventional delayed branch method.

SUMMARY OF THE INVENTION

It is an object of the present invention to provide a branch instruction processing method and scheme in a parallel processing unit by which the performance of the unit will not deteriorate when a branch is taken.

In a branch instruction processing method and arrangement according to a first aspect, a branch delay slot is defined as all instructions including an instruction positioned next to a branch instruction and instructions fetched during cycles for fetching and execution of the branch instruction.

In a branch instruction processing method and arrangement in accordance with a second aspect, a queue memory for instruction prefetch for prefetching an instruction from an instruction memory and storing the prefetched instruction is provided. A field for indicating in each entry of the queue memory that the instruction stored in the associated entry has been executed in accordance with a branch prediction is provided in the queue memory, and execution/execution inhibition of an instruction is controlled based on the value of the field.

In the first aspect, when the result of execution of a branch instruction is not a branch, an instruction to be fetched in a cycle next to the one in which a branch instruction is executed is for a branch delay slot, and, therefore, the instruction is executed without any delay due to a branch.

If the result of execution of the branch instruction is a branch, an instruction to be fetched in the next cycle next to the one in which the branch instruction is executed is to be executed next. If this instruction has been prefetched in a queue memory, a branch target instruction can be executed without any delay due to a branch simply by moving the read pointer of the queue memory.

In the second aspect, each instruction is linked with a field indicating whether or not execution has been made based on a branch prediction, and if the branch prediction is correct, the branch prediction instruction is executed, whereby time required for fetching another branch target instruction is saved, easing the deterioration of the performance.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a table showing logics in the pointer control portion shown in FIG. 1;

Figure 1:
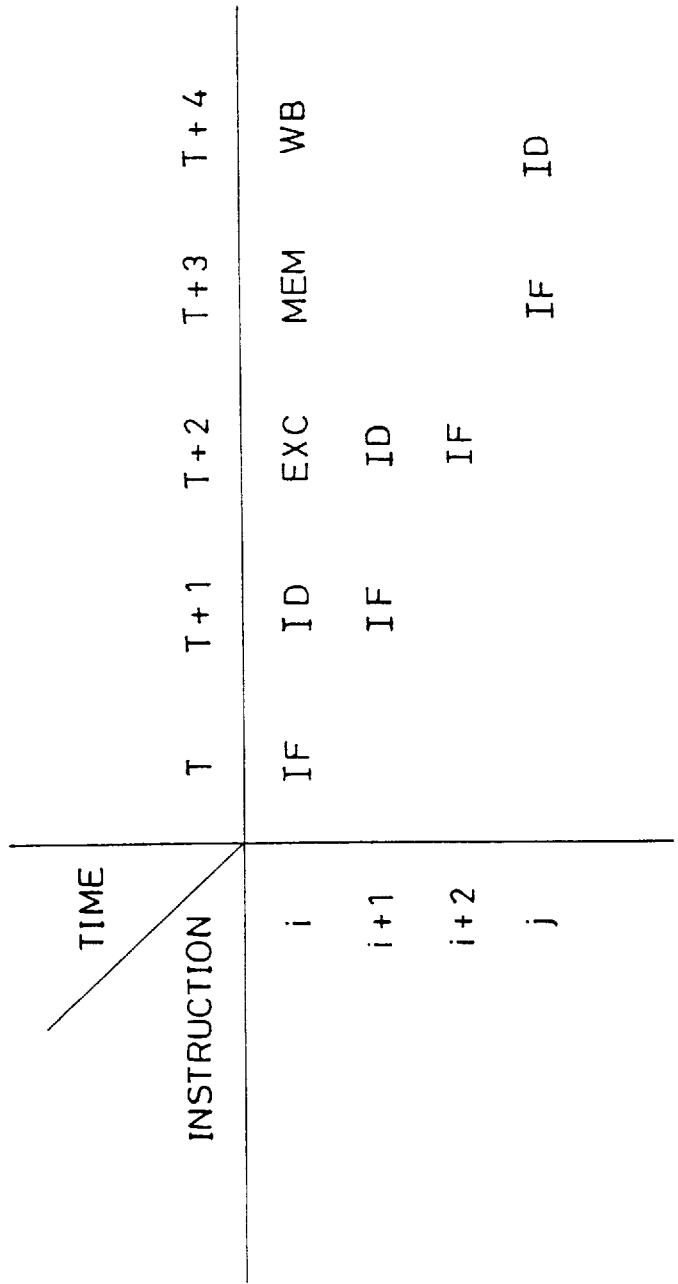
FIG. 1 is a table for illustrating a conventional branch delay operation.
Figure 2:
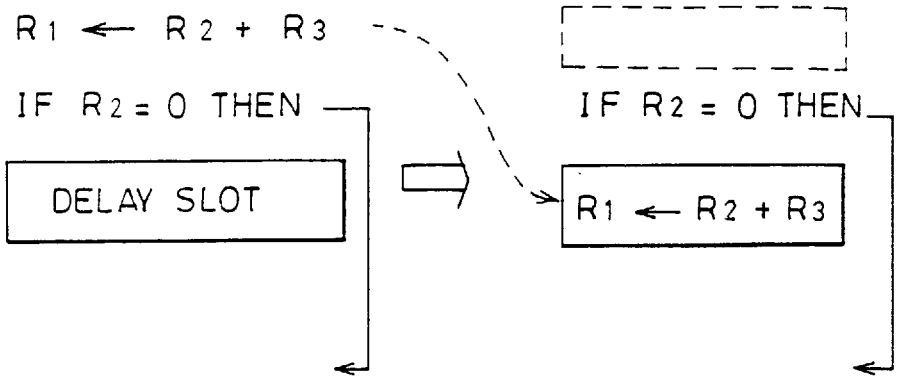
FIGS. 2(a), 2(b) and 2(c) are representations for illustrating how a branch delay slot is filled with an instruction.
Figure 2:
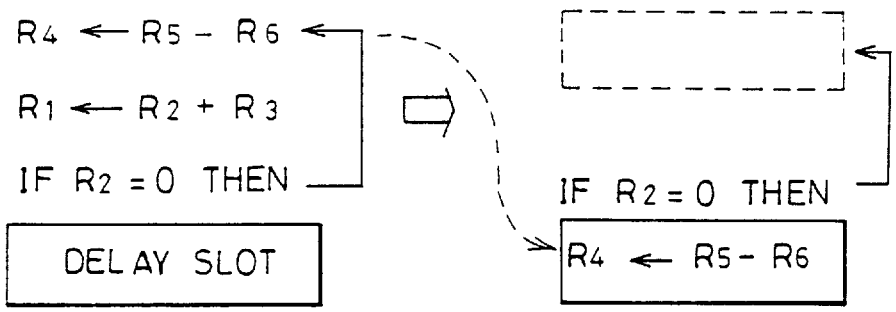
Figure 2:
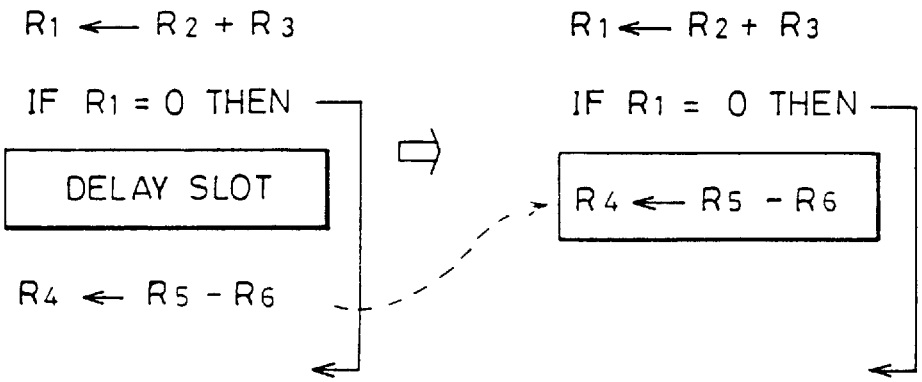
Figure 21:
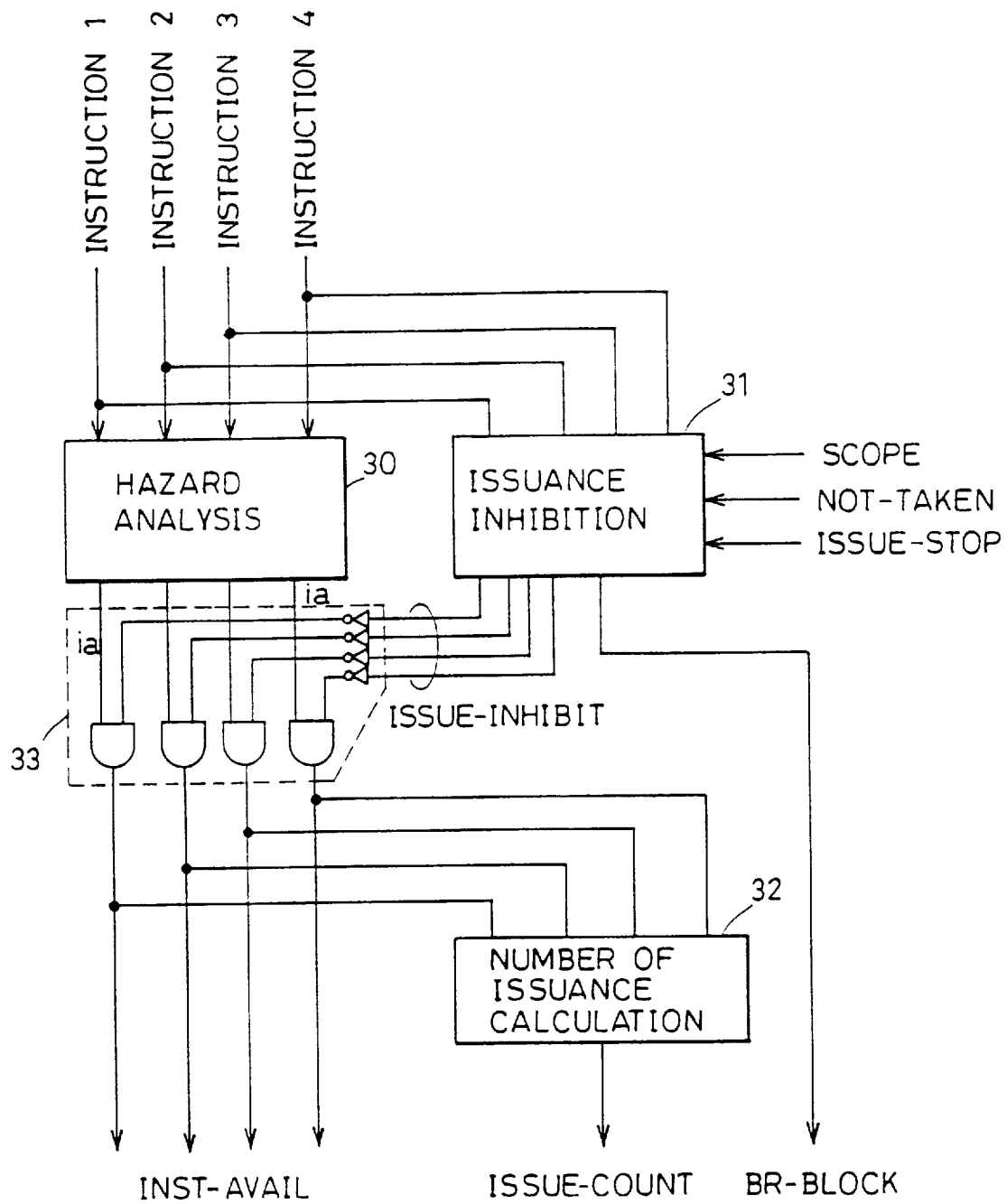
Figure 22:
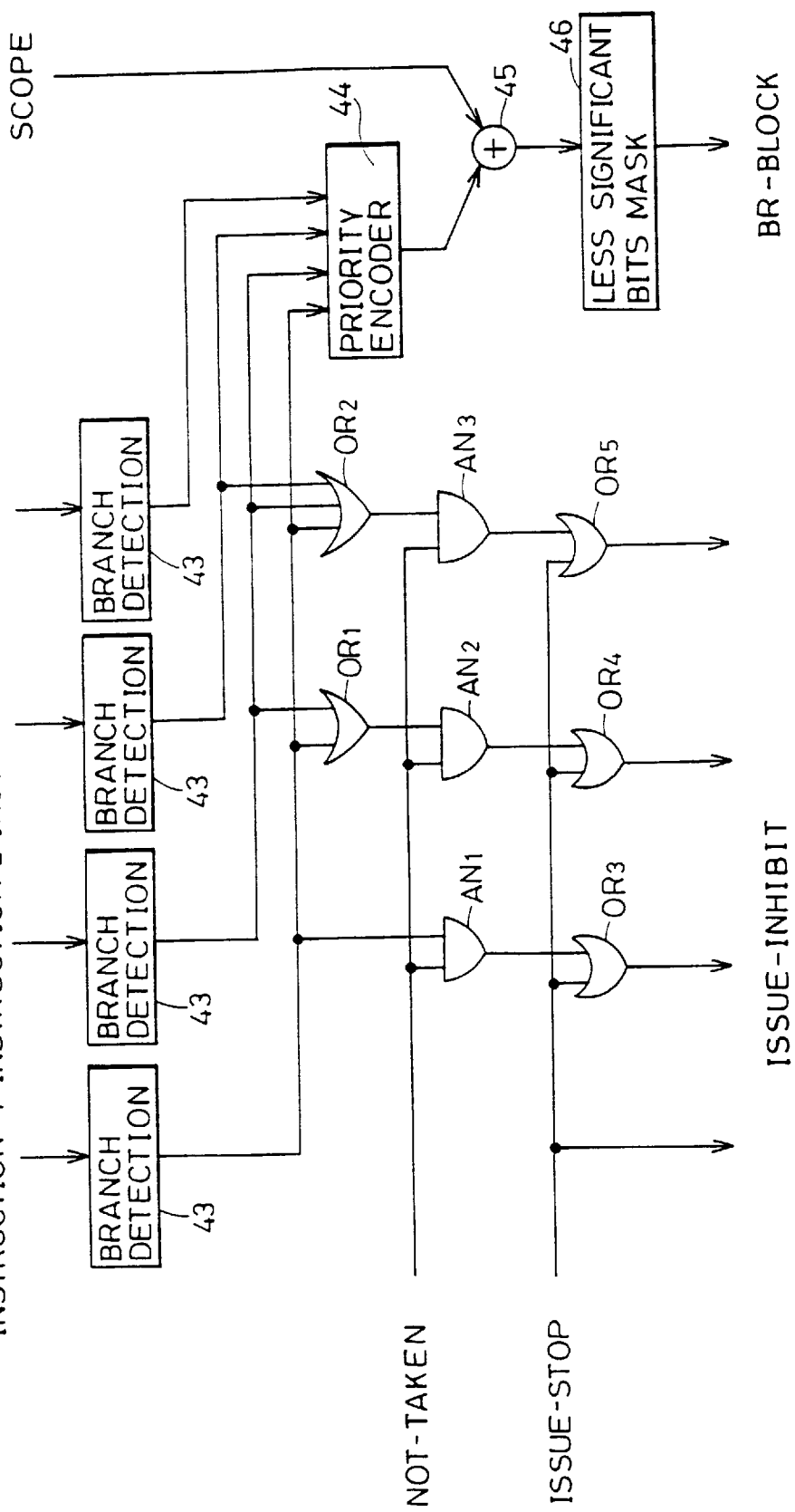
Figure 23:
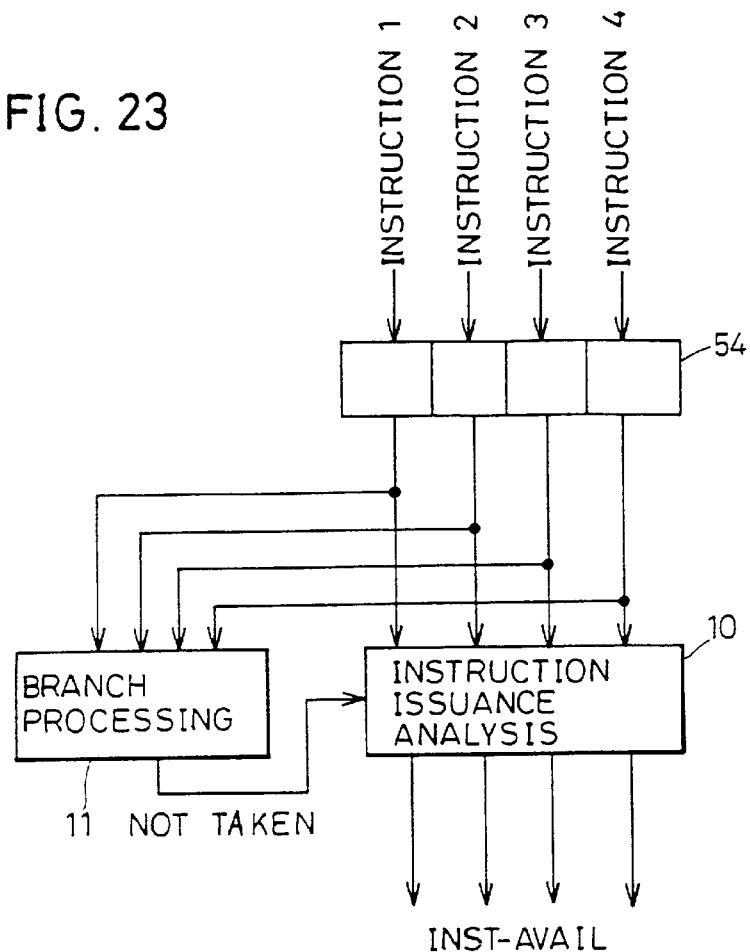
Figure 26:
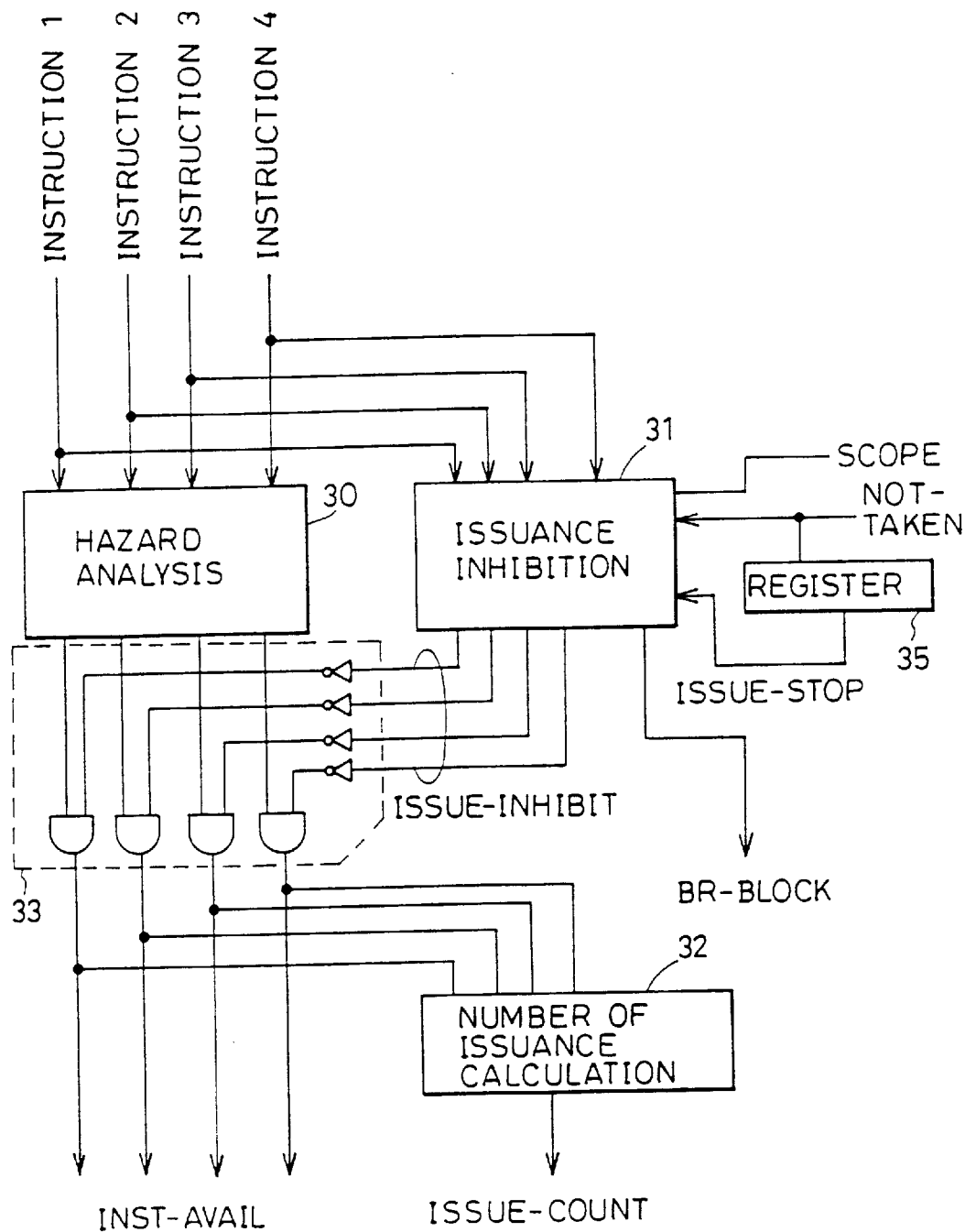
Figure 27:
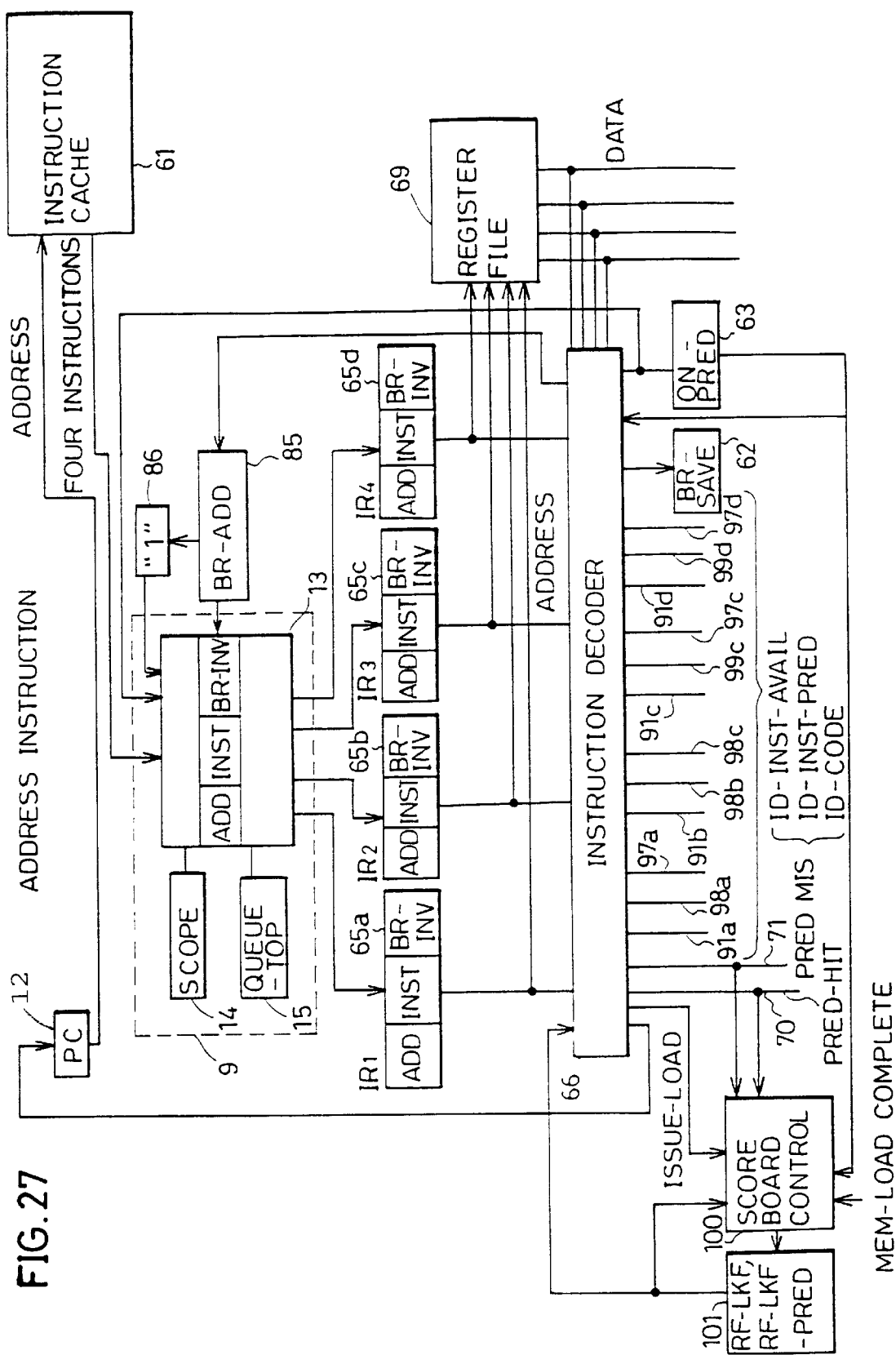
Figure 28:
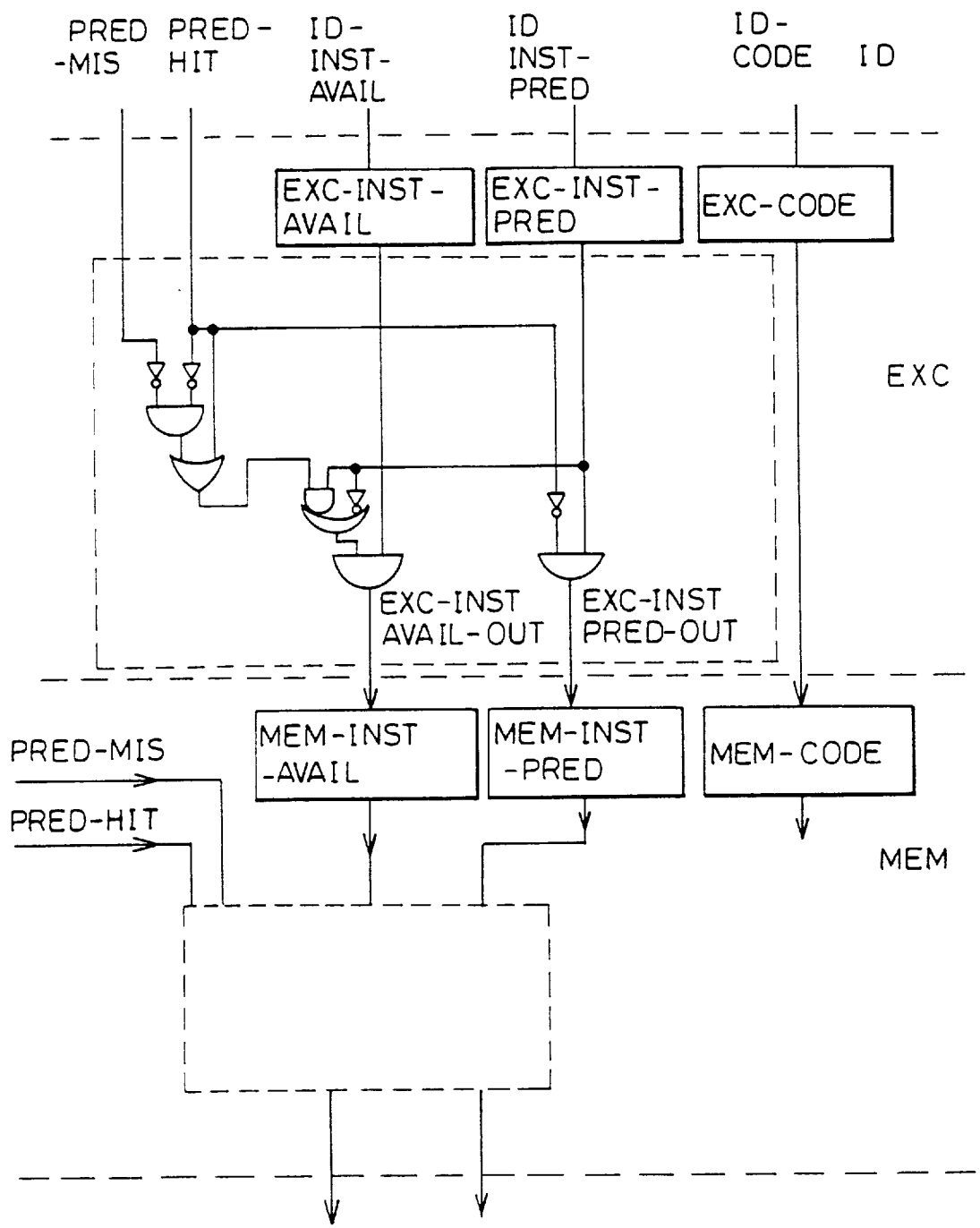

FIGS. (20A) and (20B) are a logic diagrams showing the structure of the pointer control portion shown in FIG. 1;

FIG. 21 is a block diagram showing the structure of an instruction issuance analysis portion in accordance with the first embodiment of the present invention;

FIG. 22 is a logic diagram showing the structure of the issuance inhibition portion shown in FIG. 21;

FIG. 23 is a block diagram showing the structure of an instruction decode device used in a second embodiments of the present invention;

FIGS. (24A), (24B) and (24C) are representations showing the operation of an instruction register when a branch is taken by a branch instruction in the structure of the instruction decode stage shown in FIG. 23;

FIGS. (25A), (25B) and (25C) are representations showing the operation of the instruction register shown in FIG. 23 when a branch is not taken by a branch instruction;

FIG. 26 is a block diagram showing the structure of the instruction issuance analysis portion shown in FIG. 23;

FIG. 27 is a block diagram showing the structures of an instruction fetch stage and an instruction decode stage used in accordance with the second aspect of the present invention;

FIG. 28 is a representation showing a structure for making control based on an instruction validity flag and a branch prediction flag in an execution stage EXC and presence and absence of a branch.

Figure 29:
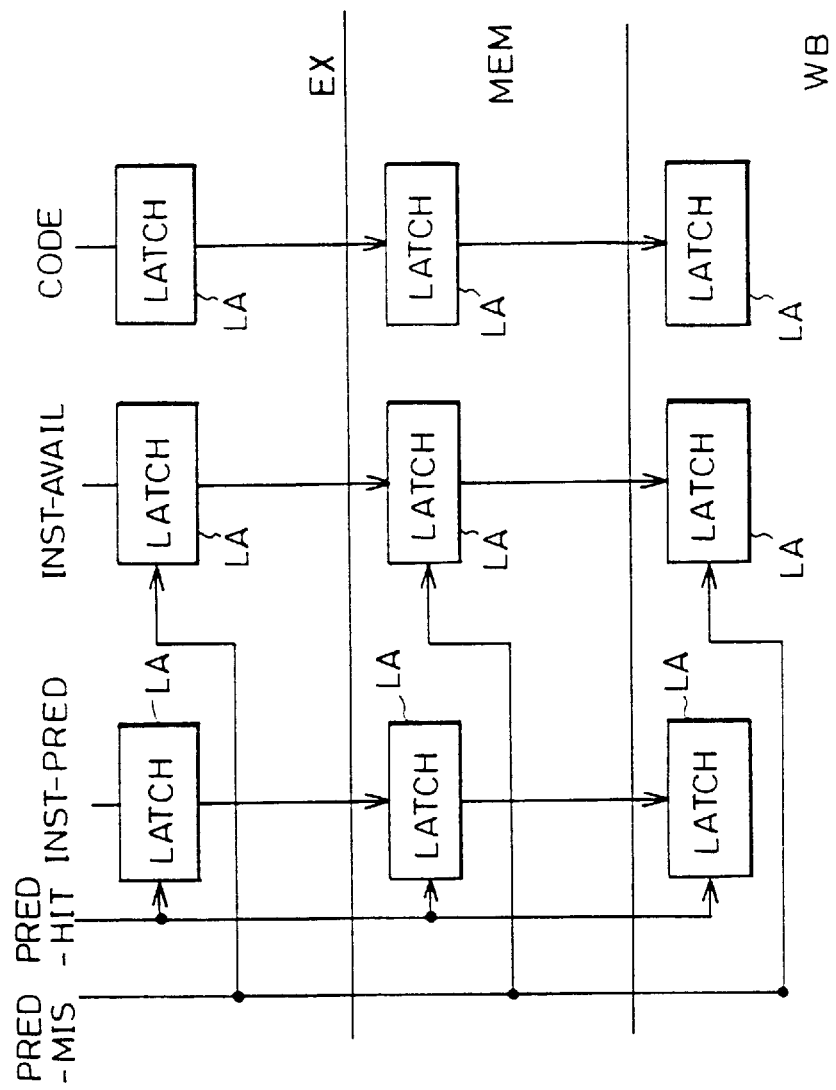
Figure 31:
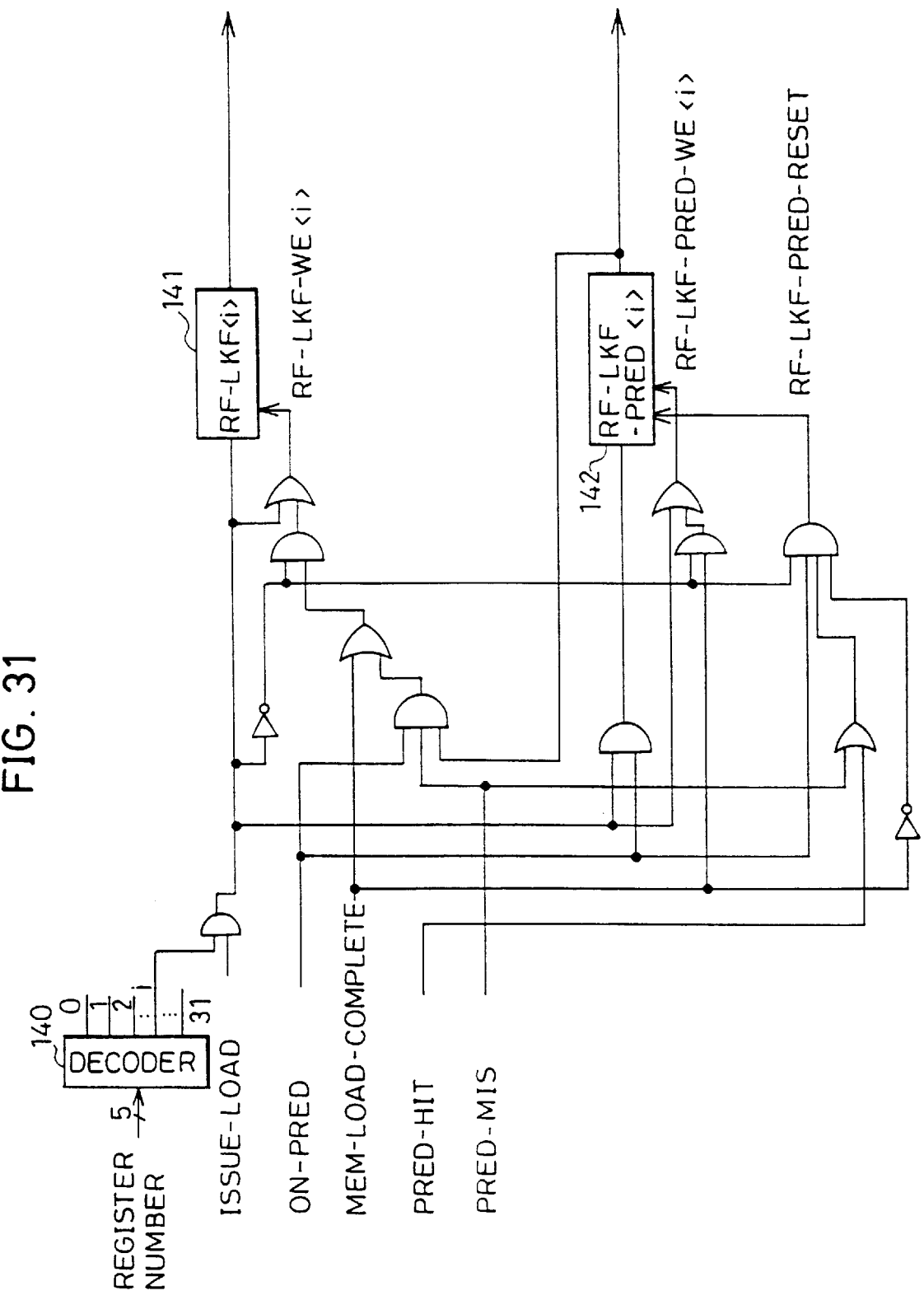
Figure 32:
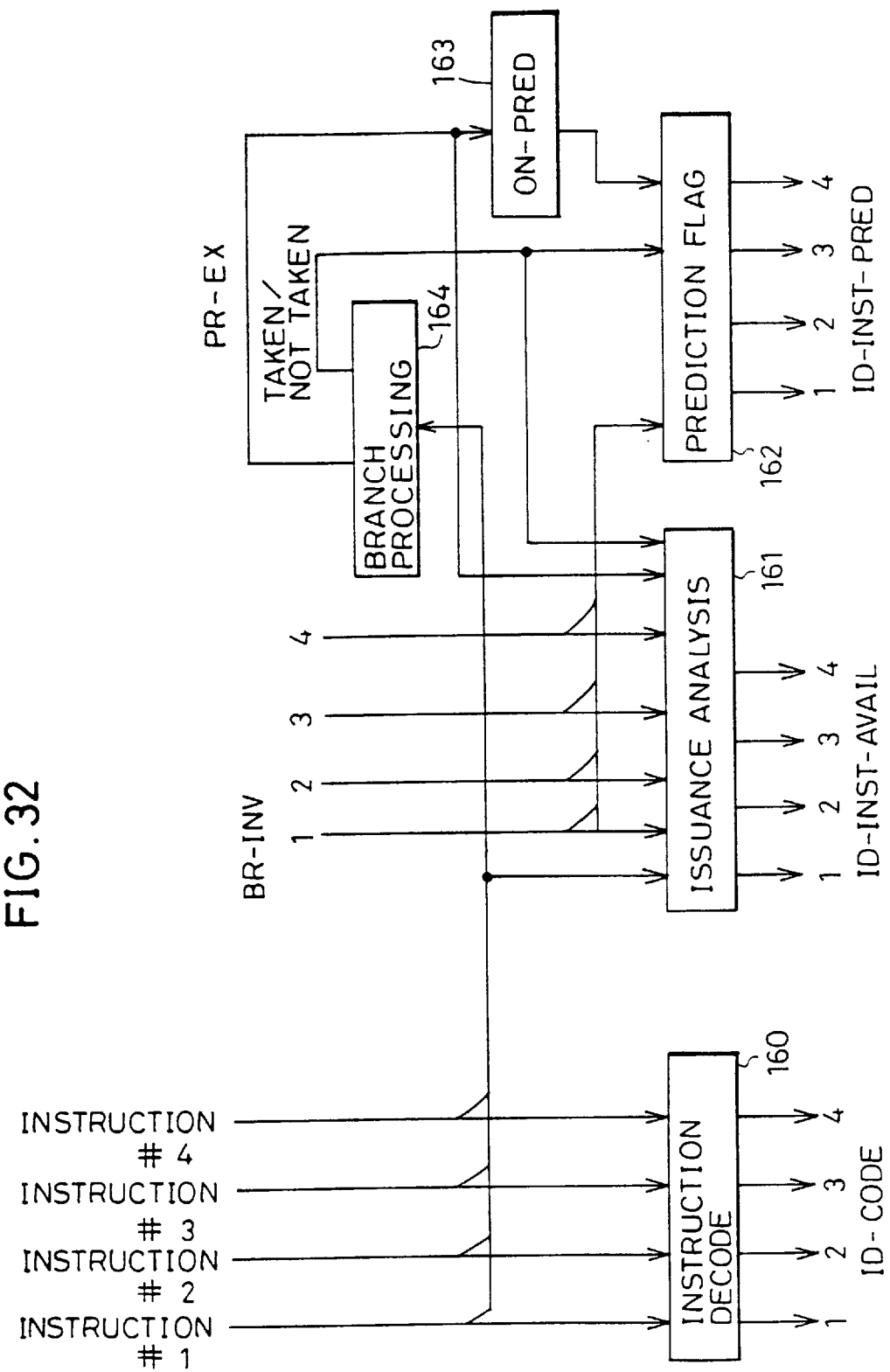

FIG. 29 is a schematic representation generally showing the structure shown in FIG. 28;

FIG. 30 is a truth table for the control signals of a scoreboard for monitoring decision of the content of a register file;

FIG. 31 is a diagram showing the structure of logic circuitry for implementing the truth table shown in FIG. 30; and FIG. 32 is a diagram showing the structure of the instruction decoder shown in FIG. 27.

DESCRIPTION OF THE PREFERRED EMBODIMENTS

EMBODIMENT 1

Figure 5:
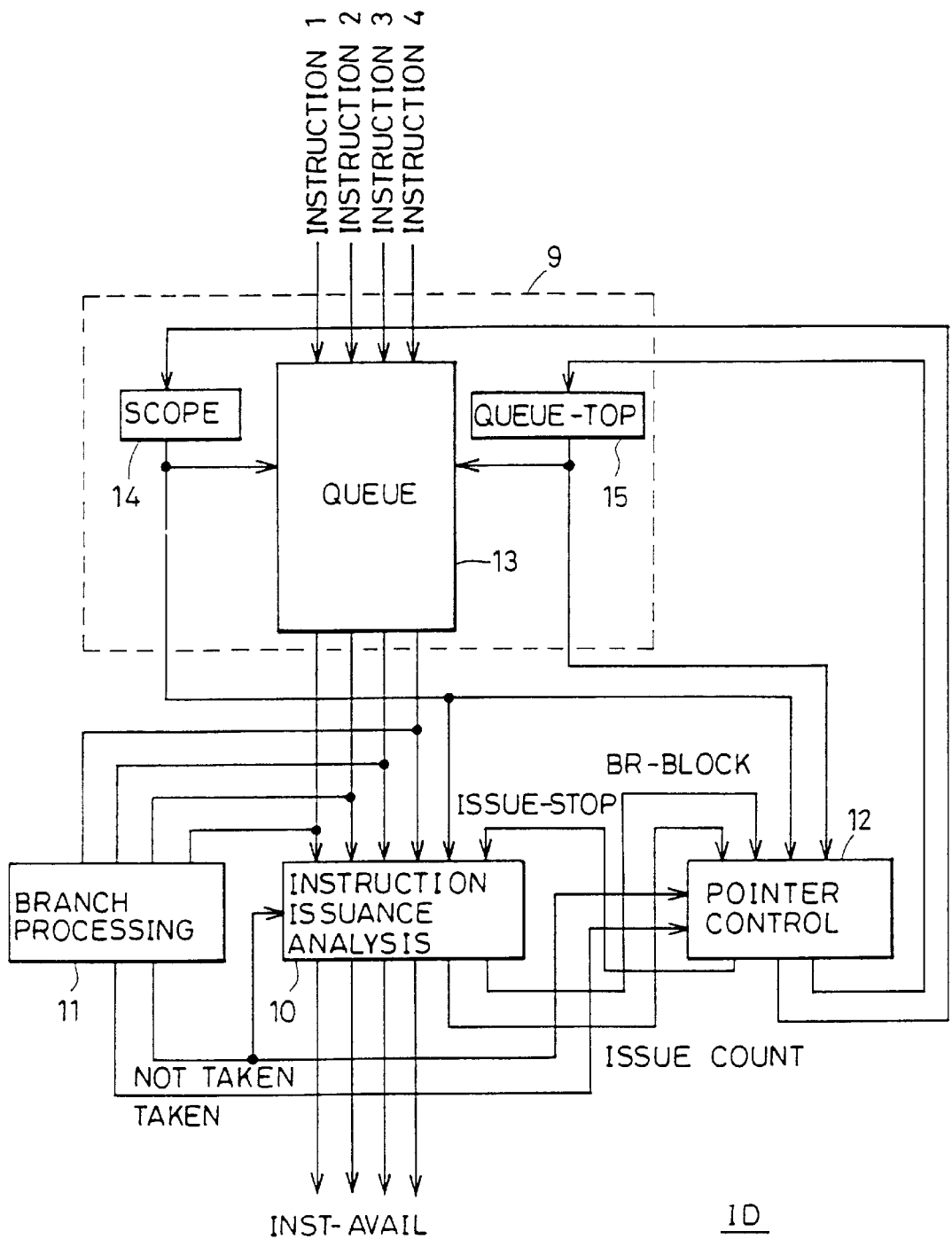
FIG. 5 is a block diagram showing a structure of an instruction decode stage in accordance with one embodiment of the present invention.

The structure of the essential part of an instruction decode stage in a parallel processing unit in accordance with one embodiment of the present invention is shown in FIG. 5. In FIG. 5, the instruction decode stage includes an instruction queue 9, an instruction issuance analysis section 10, a pointer control section 12, and a branch processing section 11.

Figure 3:
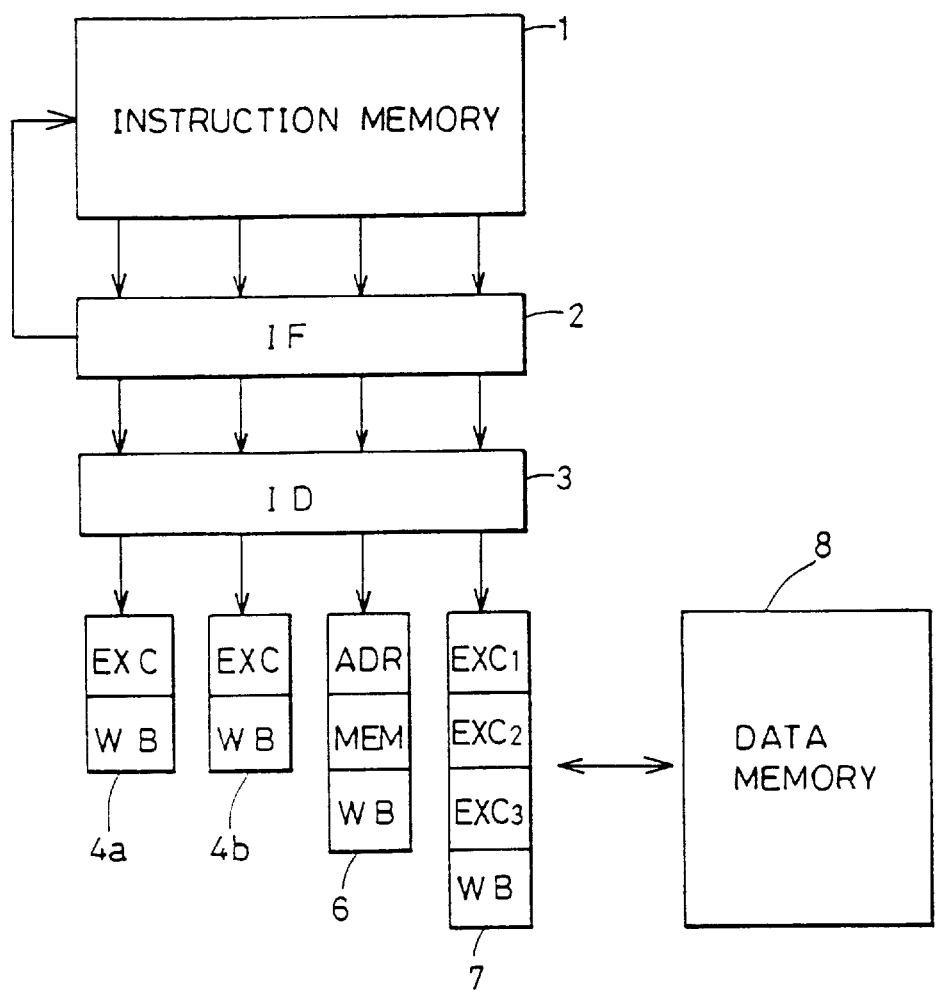
FIG. 3 is a representation showing a general structure of a superscalar.

Instruction queue 9 prefetches a plurality of instructions (instructions 1–4) from an instruction memory 1 (see FIG. 3) and stores the prefetched instructions. Queue 9 includes a memory portion (queue) 13 for storing the instructions, a read pointer 14 for holding a read address scope, and a write pointer 15 for holding a write address queue_top.

Instruction issuance analysis section 10 analyzes which instruction among the instructions read out from instruction queue 9 is issuable. The result of the analysis by instruction issuance analysis section 10 is attached to each instruction in a form of a signal inst_avail for output. When the signal inst_avail is on, the corresponding instruction is an instruction issuable and to be executed. In the structure shown in FIG. 5, four instructions starting from the read address scope are read out from instruction queue 9 at a time, and issuance analysis is conducted at instruction issuance analysis section 10. For the signal inst_avail of 4 bits, if an instruction is issuable, a corresponding signal inst_avail is turned on. Instruction issuance analysis section 10, based on the signal inst_avail, generates a signal issue_count indicating the number of issuable instructions, and sends the generated signal to pointer control section 12.

If a branch instruction is included in the given instructions, instruction issuance analysis section 10 also sends a value br_block which ignores or truncates the less significant 2 bits of the address of instruction queue 9 storing the branch instruction.

If the instructions read out from instruction queue 9 include branch conditions (in the case of a conditioned branch instruction), branch processing section 11 tests the branch condition, and decides whether or not a branch should be taken. If a branch should be taken, branch processing section 11 turns on a signal Taken and if a branch is not taken, turns on signal Not Taken.

Pointer control section 12 controls the values of the read pointer scope and write pointer queue_top of pointers 14 and 15 of instruction queue 9. Pointer control section 12 generates a signal issue_stop which entirely inhibits issuance of the instructions from instruction decode stage ID to pipelines and applies the generated signal to instruction issuance analysis section 10.

In the structure of such a superscalar by which four instructions are fetched from the instruction memory at a time and the four instructions are decoded at a time, the instructions (instructions 1–4) supplied from instruction memory 1 are stored in four addresses of queue 13 starting from the write address queue_top. In the next cycle, 4 is added to write pointer queue_top.

The four instructions stored in the four addresses of queue 13 starting from read pointer scope are read out from queue 13, applied to instruction issuance analysis section 10 and a decode circuit (not shown) to be analyzed and decoded. As a result of this analysis, if n instructions are issued, n is added to the value of the read pointer scope in the next cycle.

Figure 6:
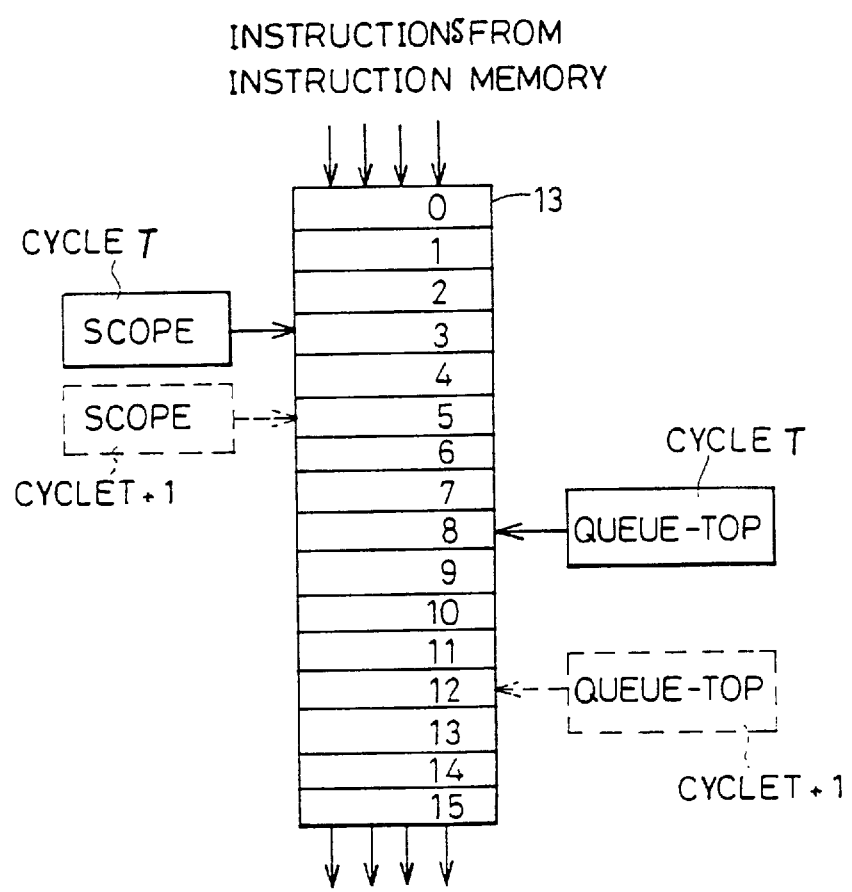
FIG. 6 is a representation showing the basic operation of the instruction queue shown in FIG. 5.

FIG. 6 illustrates the operation of instruction queue 9. In FIG. 6, the size (the number of entries) of queue 13 is set to be 16.

In cycle T, write address queue_top represents 8. The four instructions read out from the instruction memory are written in addresses 8, 9, 10, and 11.

Read pointer scope indicates 3, and instructions in the addresses 3, 4, 5, and 6 of queue 13 are read out. In this cycle T, assume that 2 instructions are dispatched to function units. In other words, the number of issued instructions (issue-count) is 2. In this case, in the next cycle T+1, the value of read pointer scope is increased by 2 to be 5. Write pointer queue_top is increased by 4 to be 12. Queue 13 can write 4 instructions at a time, and read 4 instructions at a time. These writing operation and reading operation can be carried out asynchronously.

In order to decide a branch delay slot, an instruction block is defined. The following four instructions are called an instruction block:

instructions whose addresses in an instruction queue are 4n, 4n+1, 4n+2, and 4n+3 (n: integer).

Figure 7:
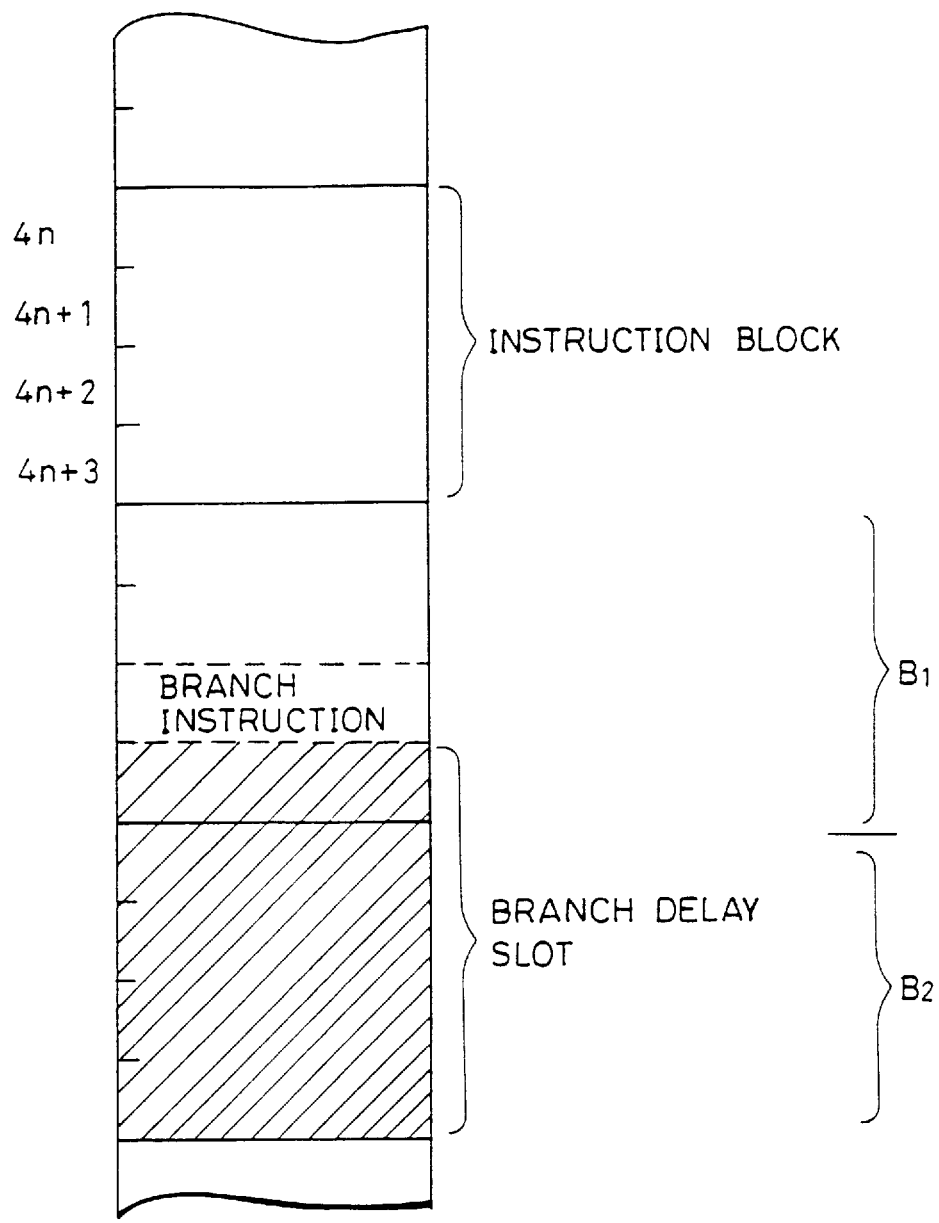
FIG. 7 is a representation for illustrating the definition of a branch delay slot.

A branch delay slot is defined to be in the range from a slot next to a branch instruction to the last slot of an instruction block next to an instruction block including a branch instruction. FIG. 7 illustrates an instruction block and a branch delay slot. In FIG. 7, if a branch instruction is included in a block B1, the range from a slot next to the branch instruction to the last slot of the next block B2 adjacent to this block B1 is defined as a branch delay slot (designated with slanted lines in FIG. 7). In the case of FIG. 7, the number of instructions included in the branch delay slot (the number of slots) is 5.

The branch delay slot is filled with instructions on the side of branching (instructions to be executed after a branch). Instructions to fill the branch delay slot are only needed to be instructions on the side of branching and instructions other than a branch instruction. More specifically, any instruction in the range from the address of a branch target instruction to an address preceding by one address to a branch instruction to be executed next will do. In a conventional delay branch method, instruction by which a correct result is provided in whatever direction a branch is directed (the presence/absence of a branch) is selected to fill a branch delay slot.

According to the present invention, the branch delay slot is only filled with instructions on the side of branching. If the result of an execution of a branch instruction indicates that no branch is taken, and the signal Not Taken is turned on, hardware makes a control so that instructions which fill the branch delay slot will not be executed. A description of an operation of an instruction queue when a branch instruction is executed follows.

"When a branch is taken: the signal Taken is on"

Assume that the value of an address in queue 13 with its less significant 2 bits omitted at which a branch instruction is stored is br_block, and the value of a write address queue_top with its less significant 2 bits omitted at the time is qt_block. A block at which a branch instruction is stored (a block in queue 13), and a block at which an instruction is written at the time are respectively shown both by omitting less significant 2 bits.

When the block addresses br_block and qt_block are equal, it indicates that a branch delay slot is not yet fetched into an instruction queue 9. In this case, the branch delay slot should be fetched in the next cycle. A given instruction is just written in the next block in queue 13. Therefore, 4 is added to a write pointer queue_top. This is represented by the following expressions.

br_block=(the address of a queue at which a branch instruction is stored) (3 . . . 2)

qt_block=queue_top (3 . . . 2)

If br_block==qt_block then queue_top=queue_top+4, where qt_block=queue_top (3 . . . 2) indicates substitution of the second and third bits of write pointer queue_top into qt_block (equivalent to omission of the less significant 2 bits, bits 0 and 1). Queue 13 has 16 entries, and the write pointer and read pointer of the queue are represented by 4 bits. Therefore, a block in the queue is identified by observing the more significant 2 bits, bits 2 and 3. Also in the above expression, "==" indicates that its right side and left side are equal in value.

The br_block and the qt block not being equal indicates that the branch delay slot has already been fetched and stored in instruction queue 9. In this case, an address in queue 13 for storing a branch target instruction, in other words an address next to a queue address at which in turn the branch delay slot is stored is set to the write pointer queue top. More specifically, If br_block!=qt_block then queue_top=br_block ##0$^2$+ 8.

In this expression, "!=" indicates that its right side and left side are not equal in value. "##" indicates that its right term and left term are combined. X$^n$ indicates that an operation X is repeated n times. Therefore, in the above expression, br_block ##0$^2$ indicates that the value br_block is set to be most significant 2 bits and 0 is added to its less significant 2 bits. The head or starting address of a block in which a branch instruction is included is produced by this operation. Adding 8 to this head address produces the head address of a block next to the next block.

Figure 4:
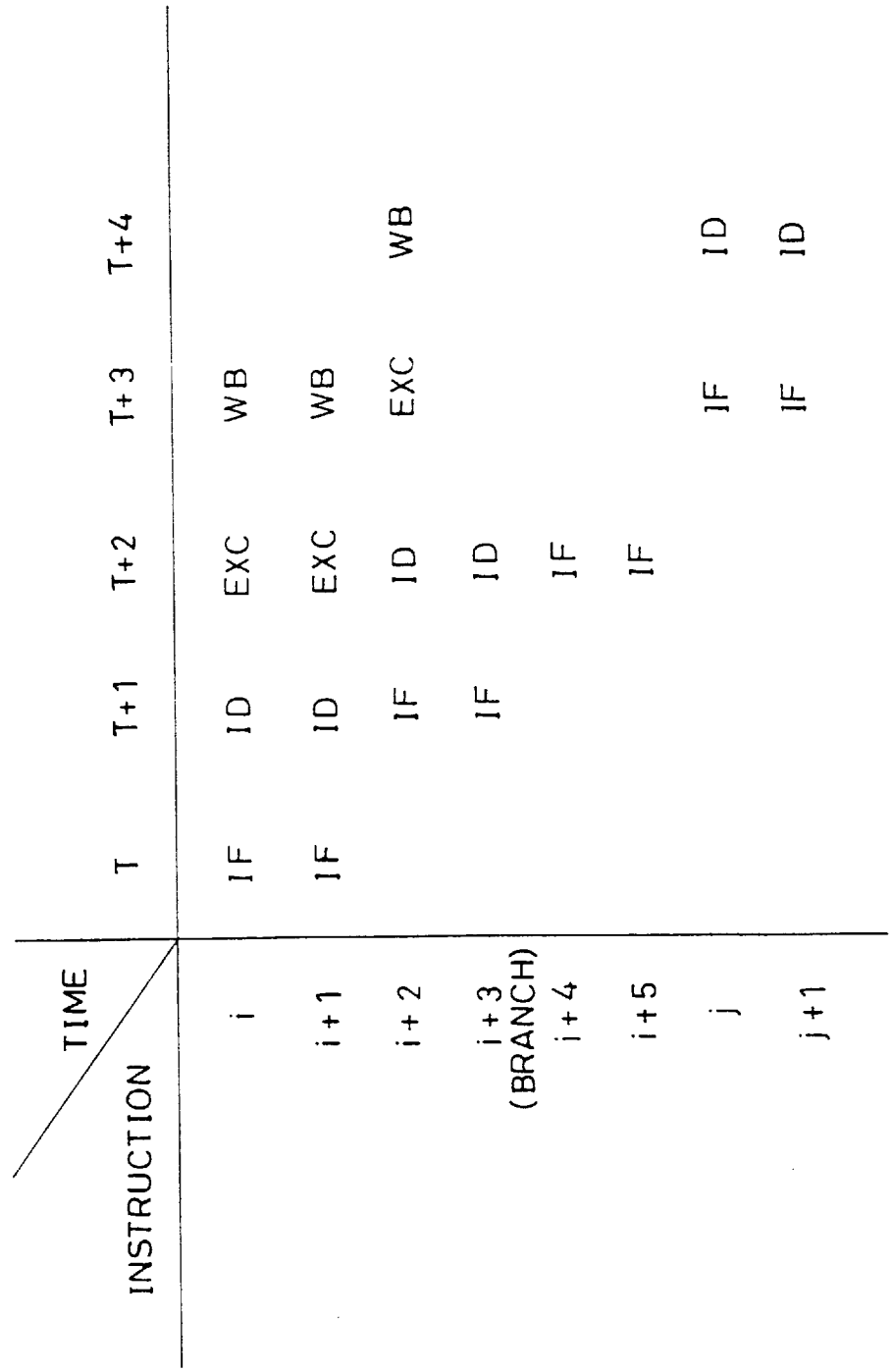
FIG. 4 is a table for illustrating a branch delay operation in a superscalar.

Furthermore, in this case, in the next cycle after the branch instruction was executed, a branch target instruction is not transmitted from the instruction memory (see FIG. 4). Therefore, in the next cycle after the branch instruction was executed, the write pointer queue_top is set to be the same as the value when the branch instruction was executed.

The read pointer scope is updated in the same manner as the case other than the case where a branch instruction is executed, regardless of a branch delay slot having been already fetched or not.

A detailed description of the aforementioned operation follows in conjunction with the drawings. An operation of a queue when a branch delay slot has not yet been fetched in a cycle in which a branch instruction is executed is shown in FIGS. 8 to 10.

Figure 8:
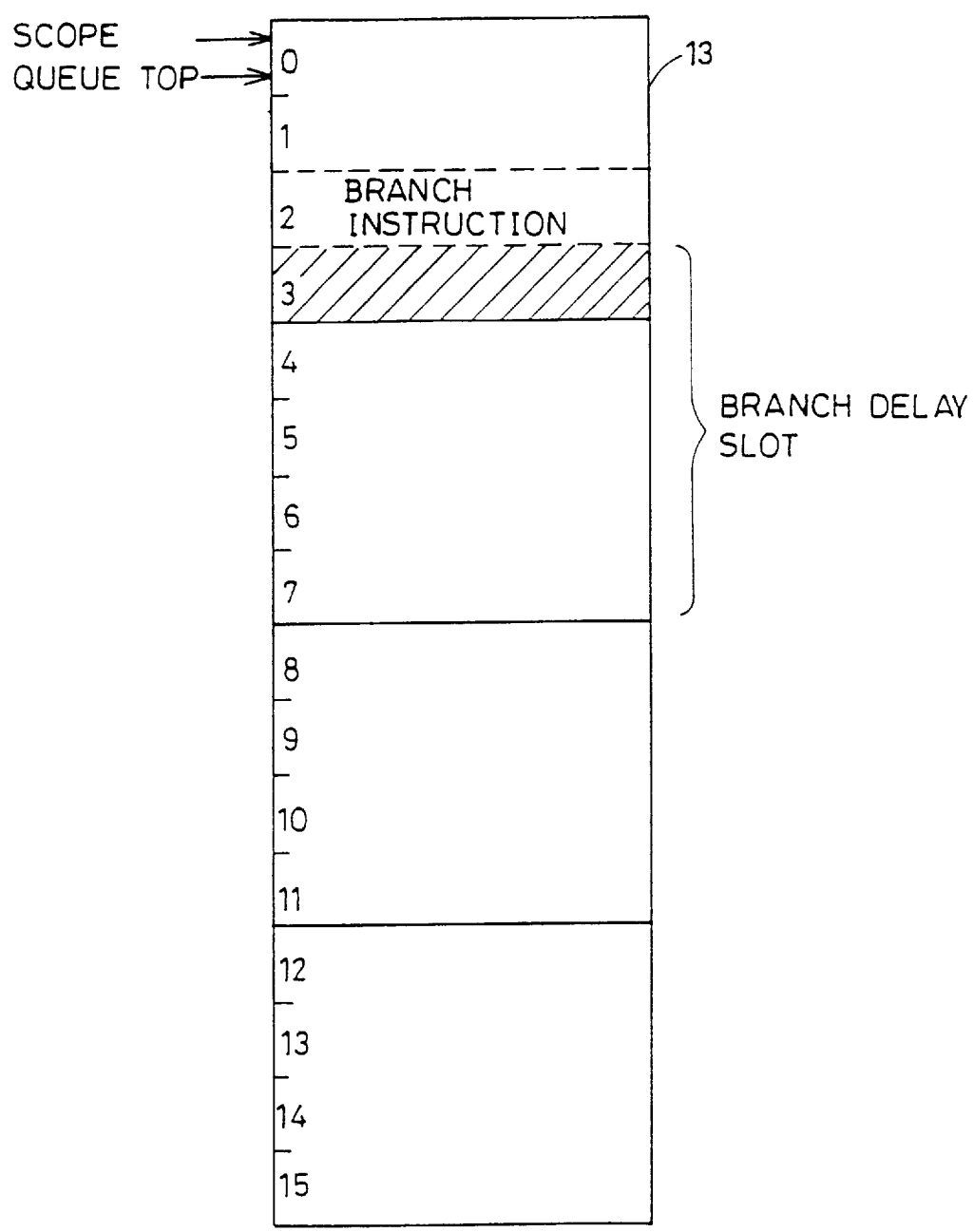
FIG. 8 is a representation showing the operation of an instruction queue when a branch is taken by a branch instruction and a branch delay slot has not yet been fetched.

FIG. 8 illustrates one example of the state of an instruction queue 9 in the cycle in which a branch instruction is executed. The read pointer scope and write pointer queue_top are both kept at the value of 0. Assume that a branch instruction exist in the address 2 of queue 13, and this branch instruction is executed in this cycle.

Figure 9:
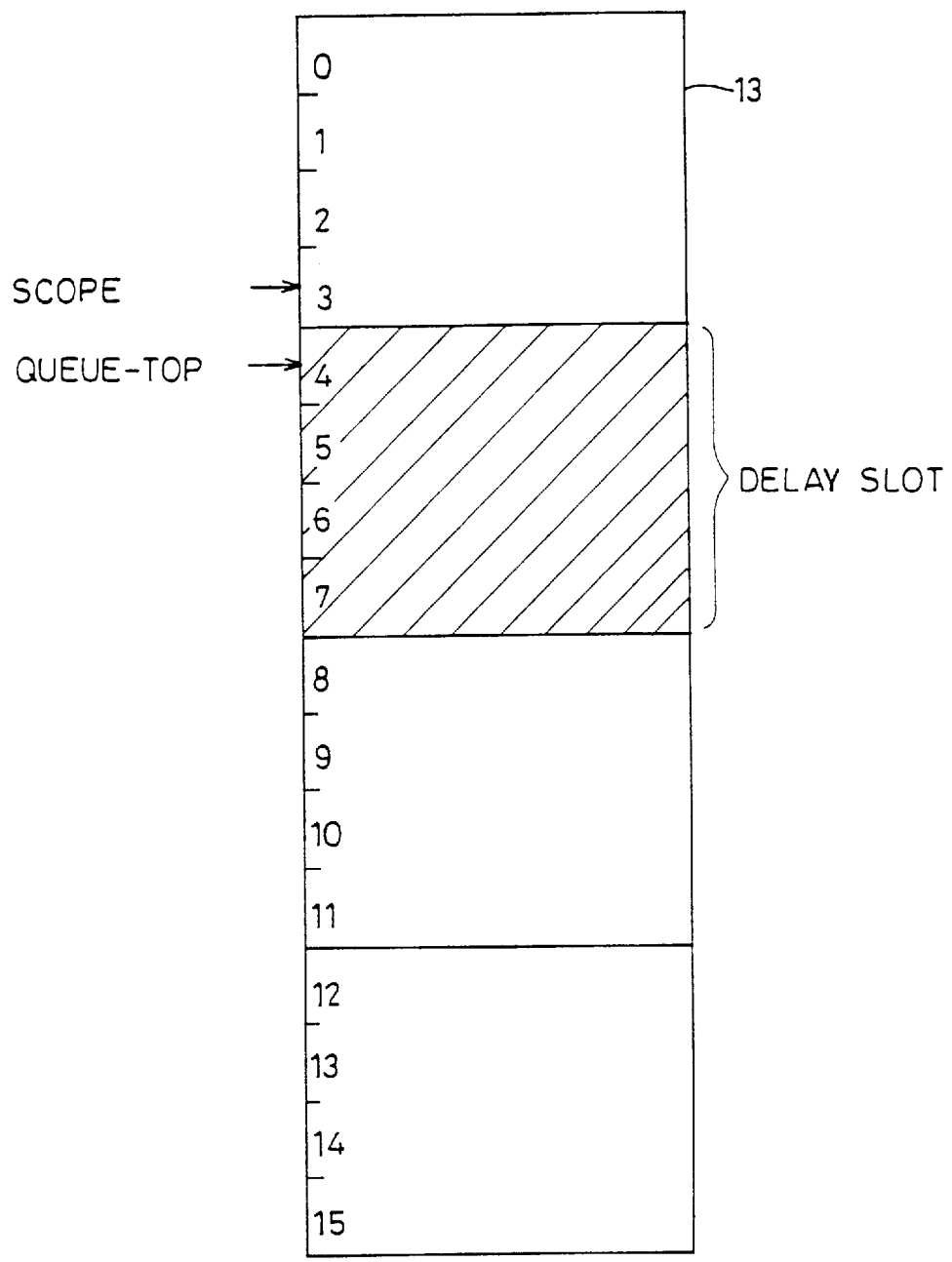
FIG. 9 is a representation showing the state of a cycle next to the instruction queue shown in FIG. 8.

In the next cycle shown in FIG. 9, from the expression br_block==qt_block, the write pointer queue_top is increased by 4 and becomes 4. The addresses 4, 5, 6, and 7 of queue 13 are written with the instructions of a delay slot (instructions on the side of branching). At the time, the instruction memory is accessed in accordance with a branch target address.

Figure 10:
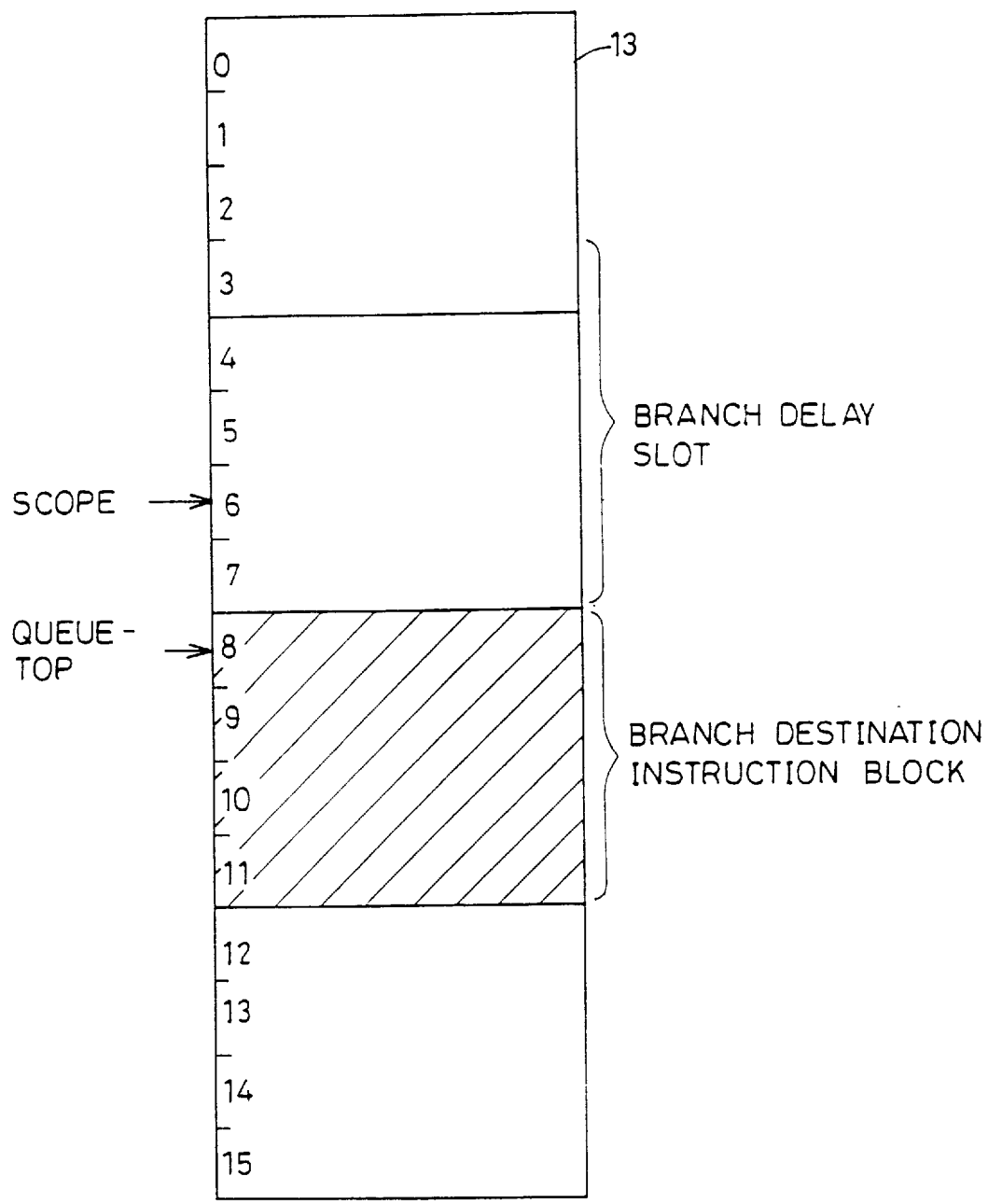
FIG. 10 is a representation showing the state of a cycle next to the instruction queue shown in FIG. 9.

In the next cycle, as shown in FIG. 10, the write pointer queue_top is increased by 4 to be 8. An instruction on a branch target is transmitted from the instruction memory. The addresses 8, 9, 10, and 11 of queue 13 are written with the instruction on the branch target. The instruction in the delay slot shown by the read pointer scope which underwent change in accordance with an issued instruction(s) are instructions on the side of branching. After an issuance of an instruction in the branch delay slot, the fetched branch target instructions are transmitted to a decode stage. Therefore, if a branch delay slot has not yet been fetched in the cycle in which a branch instruction is executed, performance deterioration (emptiness in a pipeline) due to the branch being taken is not generated.

Figure 11:
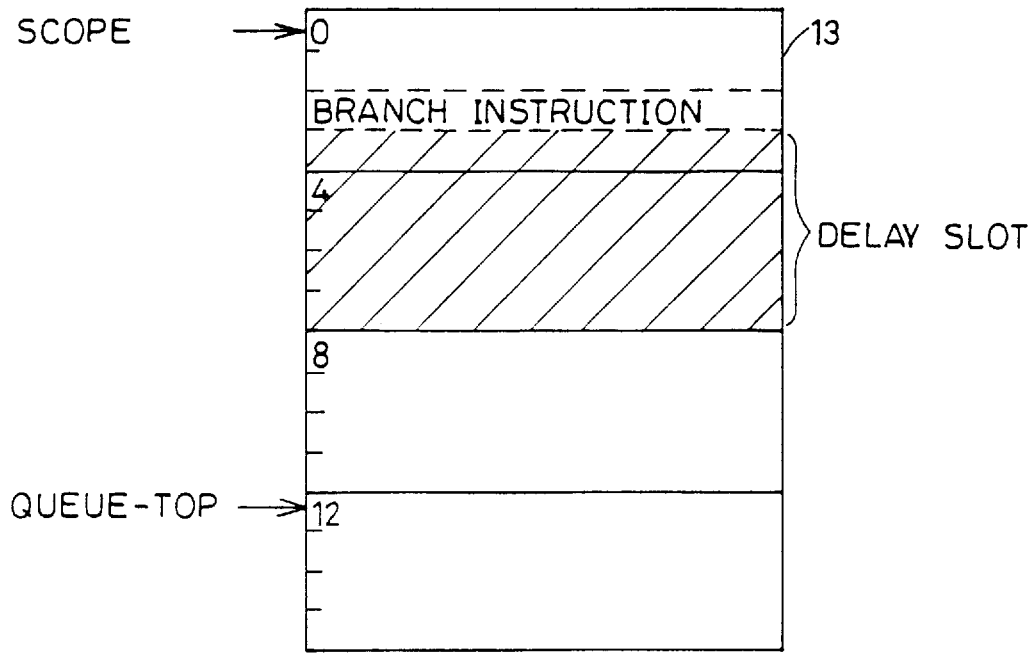
FIG. 11 is a representation showing the operation of an instruction queue when a branch is taken by a branch instruction and a branch delay slot has already been fetched.
Figure 12:
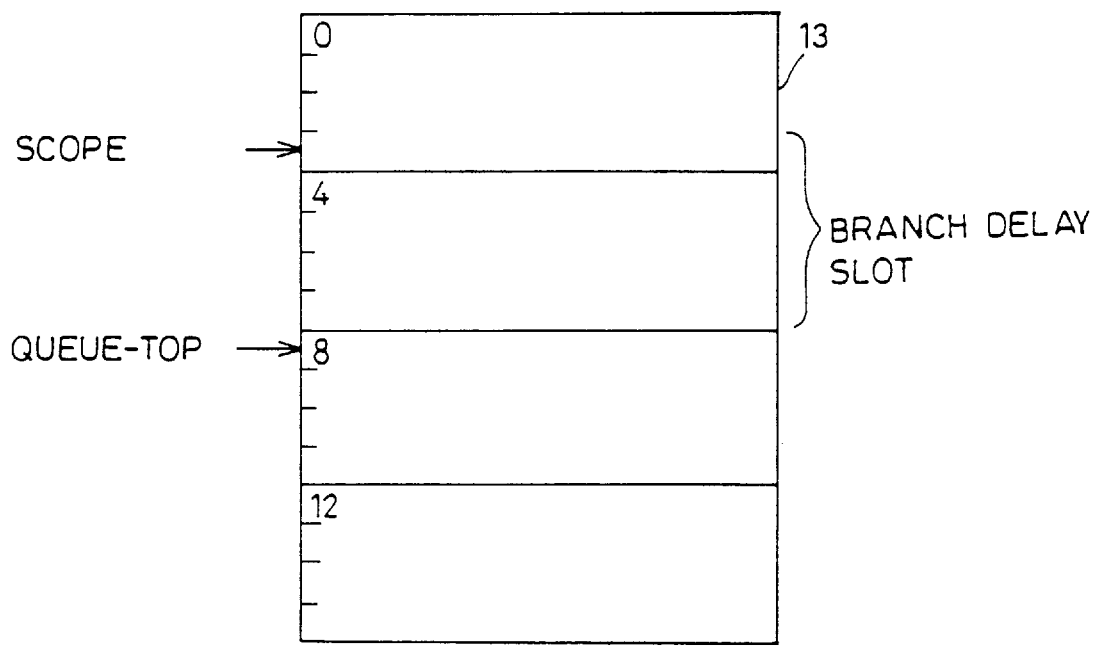
FIG. 12 is a representation showing the operation of an instruction queue when a branch is taken by a branch instruction and a branch delay slot has already been fetched.
Figure 13:
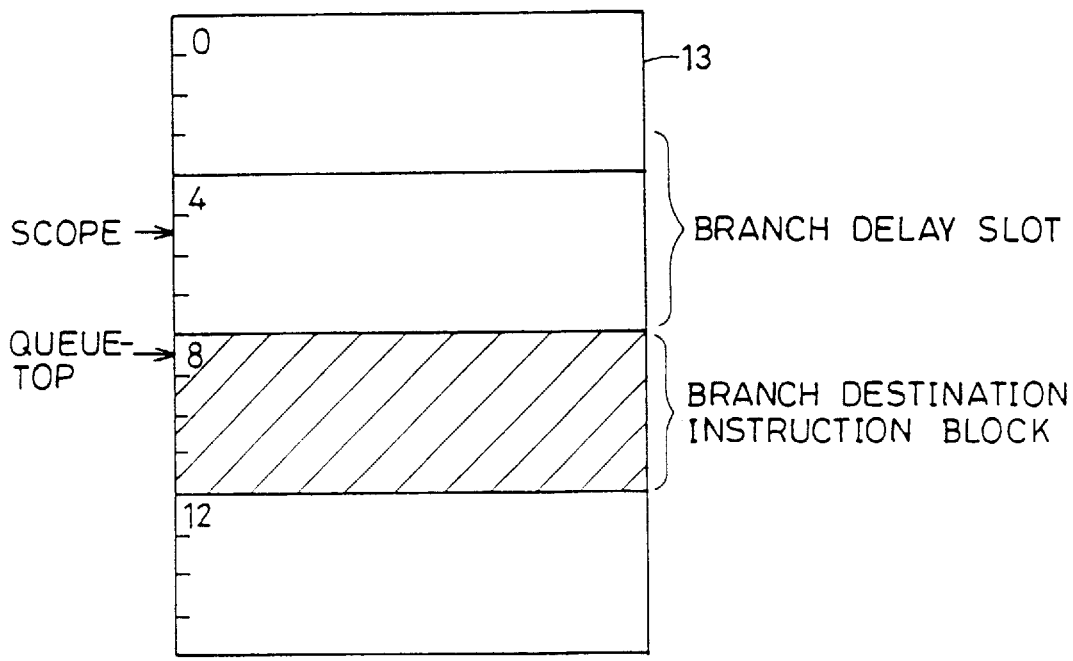
FIG. 13 is a representation showing the operation of an instruction queue when a branch is taken by a branch instruction and a branch delay slot has already been fetched.

FIGS. 11 to 13 illustrate the states of instruction queue 9 when a branch delay slot has already been fetched in the cycle in which a branch instruction is executed.

FIG. 11 shows one example of the state of queue 13 in the cycle in which a branch instruction is executed. The read pointer scope indicates 0, and the write pointer queue_top indicates 12. Now, consider a case where a branch instruction exists in the address 2 of queue 13 and the branch instruction is executed in this cycle.

In the next cycle shown in FIG. 12, the write pointer queue_top becomes 8 in order to hold the next address of the branch delay slot. In this cycle, an instruction incoming from the instruction memory is an unnecessary instruction. In other words it is an instruction on a branch target side other than the delay slot (an instruction to be executed when a branch is not taken). Therefore, in the next cycle shown in FIG. 13, the value of the write pointer queue_top is not updated. This unnecessary instruction may be written in queue 13. This instruction is to be only replaced with a branch target instruction in the next cycle.

In the cycle shown in FIG. 12, the instruction memory is accessed in accordance with a branch target address.

In the cycle shown in FIG. 13, a branch target instruction is transmitted from the instruction memory. The write pointer queue_top holds the next value of the branch delay slot. Therefore, queue addresses 8, 9, 10, and 11 are written with branch target instructions. As can be clearly seen from the operation shown in FIGS. 11 to 13, if a branch delay slot has already been fetched in the cycle in which a branch instruction is executed, no performance deterioration is caused by a branch taking.

"When a branch is not taken: Not Taken is on"

Among the instructions read out from instruction queue 9 and decoded, an instruction behind a branch instruction is invalidated. This is because the instructions behind the branch instruction correspond to a branch delay slot and the branch delay slot includes only instructions on the side of branching. As described above, an instruction on the side of branching which is in a branch delay slot is an branch target side instruction to be executed when a branch is taken by this branch instruction. More specifically, the instructions on the side of branching range from an instruction of a branch target address executed when a branch is taken by a branch instruction associated with this branch delay slot to an instruction in an address instruction preceding by one instruction to the branch instruction to be executed next. Therefore, when a branch is taken, an instruction to be dispatched into a branch target instruction block is an instruction to be executed subsequently to instructions constituting the delay slot.

If no branch is taken and the signal Not Taken is on, an instruction in the branch delay slot must not be executed in the next cycle. The instruction in the branch delay slot is skipped, and the next instruction should be executed. Therefore, the read pointer scope is represented by the following expression:

scope=br_block##$0^2$+8

If an instruction block next to the branch delay slot has already been fetched, an instruction to be executed has already been fetched in the cycle next to the cycle in which the branch instruction is executed. Therefore, no deterioration in performance is caused by the execution of the branch instruction.

If the branch delay slot has not yet fetched, in other words if the pointer br_block and the pointer qt_block are equal, an instruction to be executed has not yet been fetched in the cycle next to the cycle in which the branch instruction is executed. In order to wait for fetching of the instruction to be executed, the pipeline should be stopped for 1 cycle. More specifically, if the pointer br_block and the pointer qt_block are equal, issuance of any instruction is inhibited in the next cycle.

Regardless whether or not the branch delay slot has already been fetched, the write pointer queue_top is updated in the same manner as the case other than the case where a branch instruction is executed.

Figure 14:
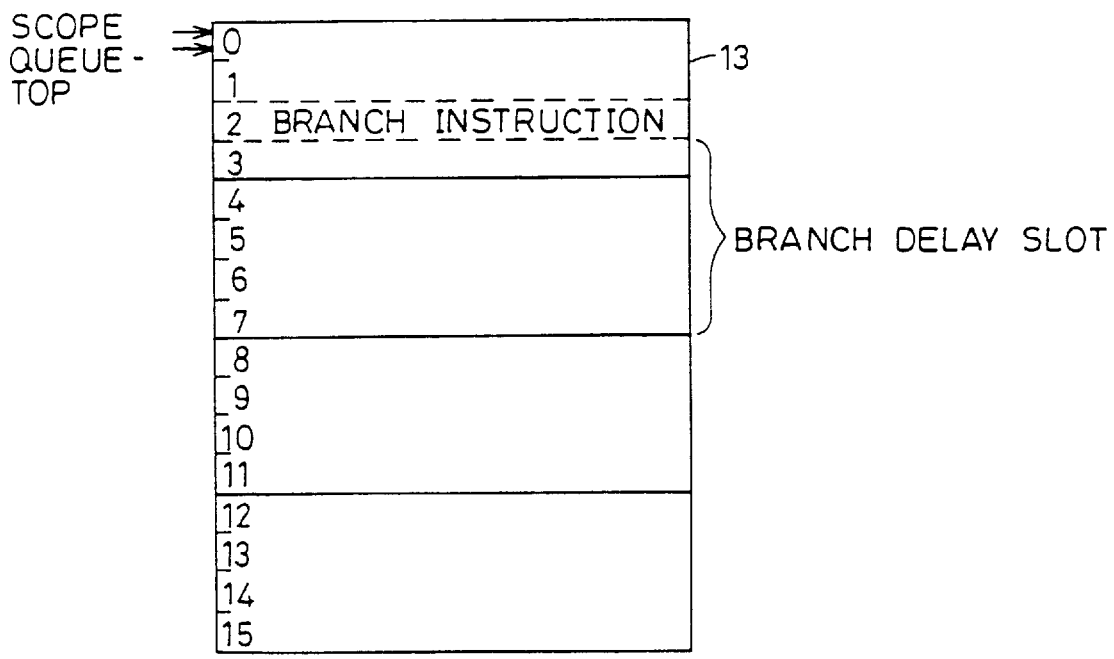
FIG. 14 is a representation showing the operation of an instruction queue when no branch is taken by a branch instruction, and a branch delay slot has already been fetched.
Figure 15:
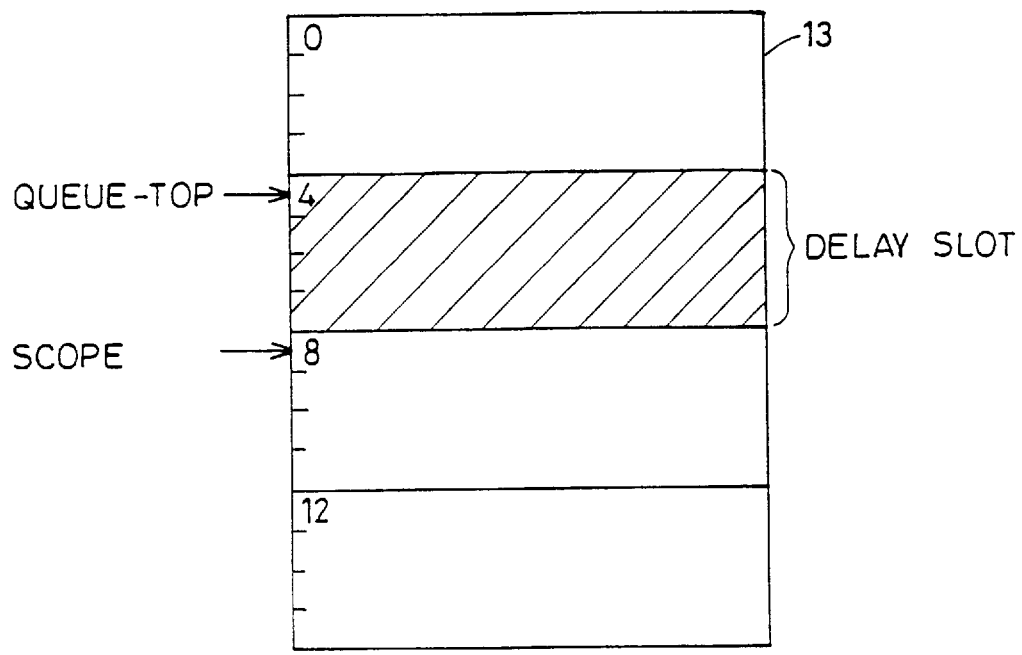
FIG. 15 is a representation showing the operation of an instruction queue when a branch is not taken by a branch instruction, and a branch delay slot has not yet been fetched.
Figure 16:
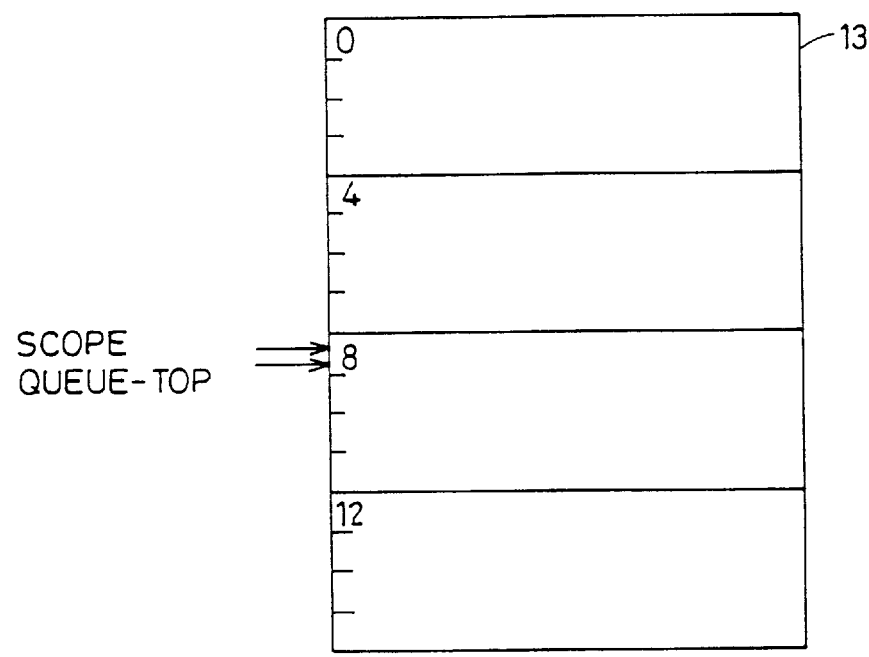
FIG. 16 is a representation showing the operation of an instruction queue when a branch is not taken by a branch instruction, and a branch delay slot has not yet been fetched.

FIGS. 14 to 16 specifically illustrate an operation of an instruction queue when the signal Not Taken is on and a branch delay slot has not yet been fetched. Referring to FIGS. 14 to 16, a description of the operation of the instruction queue when a branch is taken by a branch instruction and a branch delay slot has not yet been fetched follows.

FIG. 14 shows one example of the state of queue 13 in the cycle in which a branch instruction is executed. The read pointer scope and the write pointer queue_top both indicate 0. Assume that a branch instruction exist in the address 2 of queue 13, and the branch instruction is executed in this cycle.

In the cycle next to the branch instruction execution shown in FIG. 15, the write pointer queue_top is subjected to addition of 4 and becomes 4. Addresses 4, 5, 6, and 7 of queue 13 are written with instructions in a delay slot. Instructions to be executed are not stored in the addresses 8, 9, 10, and 11 of queue 13. Issuance of an instruction in this cycle is inhibited. More specifically, an issuance inhibition signal issue_stop is transmitted to the instruction issuance analysis section 10 shown in FIG. 15, and issuance of instructions is inhibited.

In the next cycle (FIG. 16), the write pointer queue_top is subjected to addition of 4 and becomes 8. At the time, with the read pointer scope indicating 8, the instruction block transmitted from the instruction memory is simultaneously read out and sent to the instruction decoder.

The stages of the superscalar operate with non-overlapping two phase clock (T clock and L clock), the input stage of each stage is provided with a latch circuit responsive to the T clock for latching an applied signal, and the output portion is provided with an L latch responsive to an L clock signal for latching an applied signal. At that time, writing of data into queue 13 is conducted in response to the T clock signal, while reading of data is conducted in response to the L clock signal, and, therefore writing of an instruction applied from the instruction memory into queue 13 and transmission thereof into the instruction decoder are implemented at a time. These writing and reading of data may be conducted in response to the T clock signal, with the reading timing for data being retarded to the writing timing of data, and the data of queue 13 may be read out when it is decided.

In the cycle in which a branch instruction is executed shown in FIGS. 17 and 18, an operation of a queue when a branch delay slot has already been fetched will be described.

Figure 17:
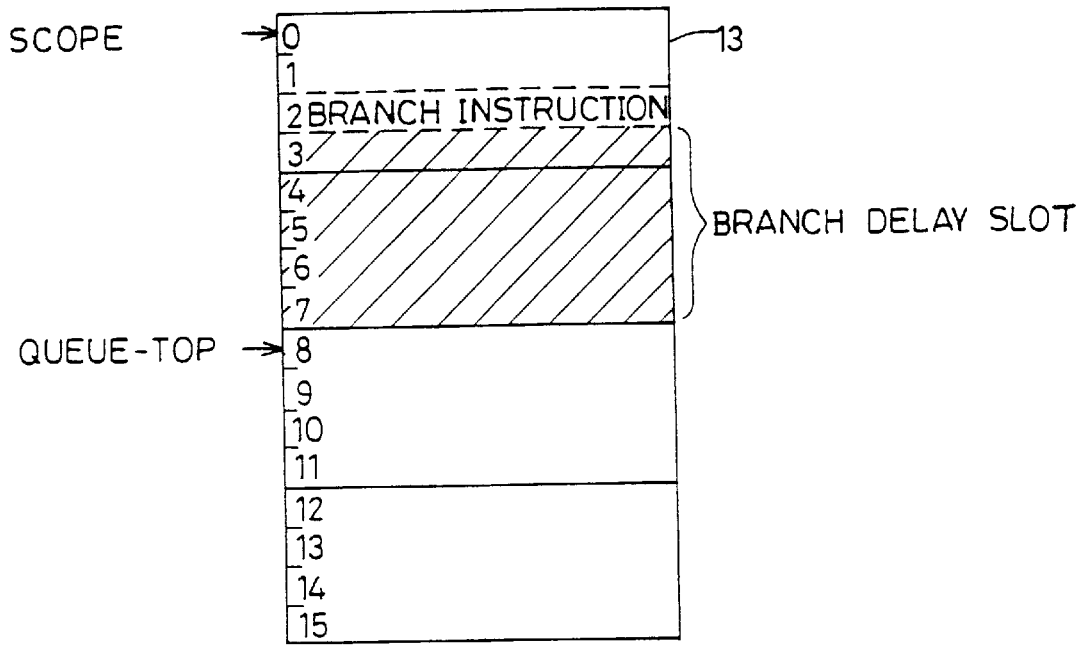
FIG. 17 is a representation showing the operation of an instruction queue when a branch is not taken by a branch instruction, and a branch delay slot has already been fetched.

FIG. 17 illustrates one example of the state of instruction queue 9 in the cycle in which a branch instruction is executed.

The read pointer scope indicate 0, while the write pointer queue_top indicates 8. Assume that a branch instruction exists in the address 2 of queue 13, and the branch instruction is executed in the cycle shown in FIG. 17.

Figure 18:
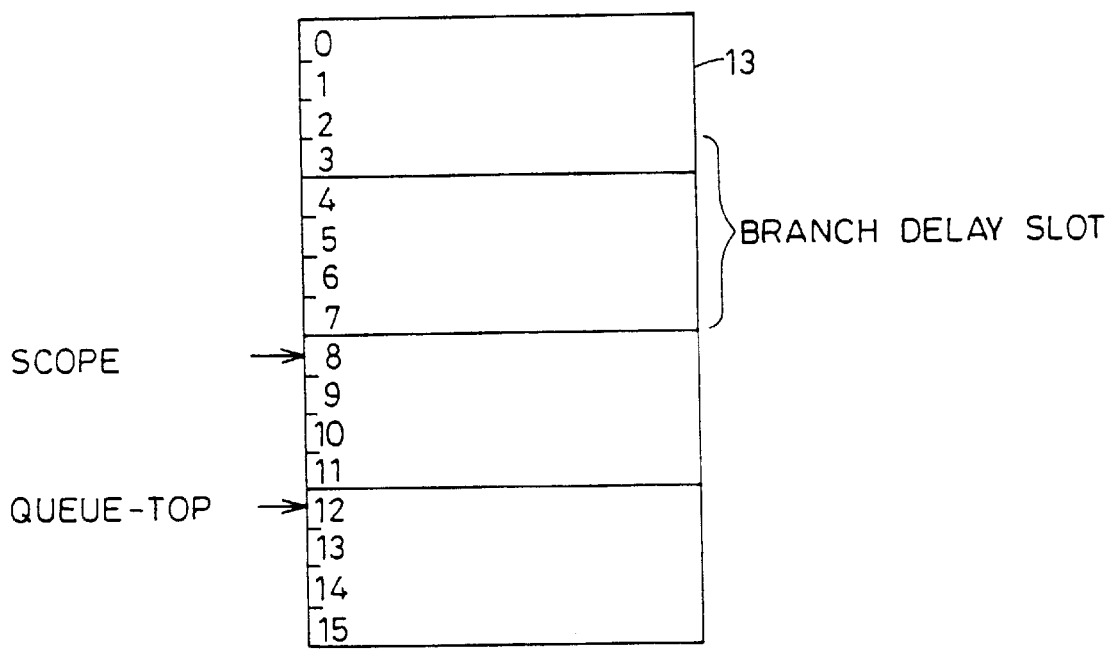
FIG. 18 is a representation showing the operation of an instruction queue when a branch is not taken by a branch instruction, and a branch delay slot has already been fetched.

In the next cycle shown in FIG. 18, the read pointer scope becomes 8 in order to indicate the next address of the delay slot. The write pointer queue_top is increased by 4 to become 12 as in a usual case.

As described above, when a branch delay slot has already been fetched in the cycle in which a branch instruction is executed, no deterioration is caused in performance due to the execution of the branch instruction. If no branch delay slot has been fetched, fetch waiting for 1 cycle is caused when a branch is not taken. However, generally, if the bandwidth of instruction fetch (the number of instructions fetched in one cycle) is set larger than the average speed of instruction issuance (the average number of instructions issued in one cycle), the probability that a delay slot will have already been fetched in the cycle in which a branch instruction is executed is high. Therefore, this structure keeps the probability very low that the performance of the processing unit will deteriorate by execution of a branch instruction.

FIG. 19 shows a list of logics (described above) achieved by a pointer control section 12. In FIG. 19, "x" indicates an arbitrary value. "–" indicates that it is not specified.

Figure 20:
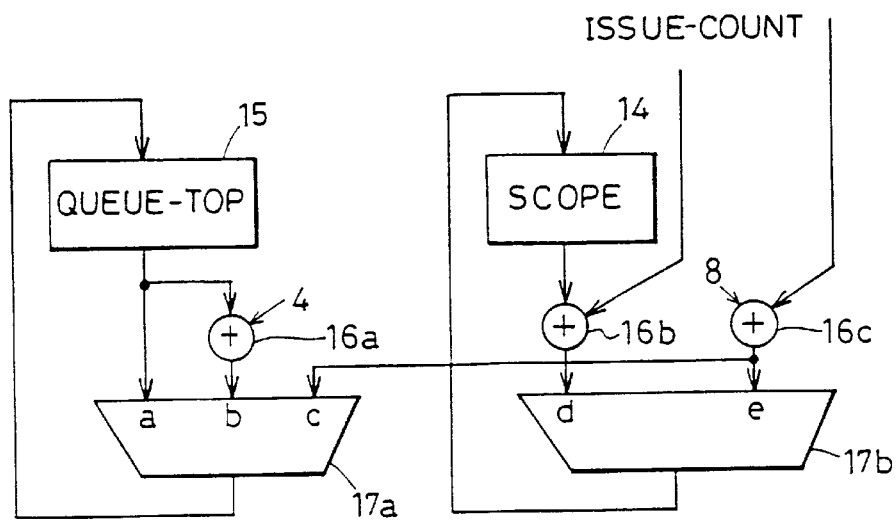
Figure 20:
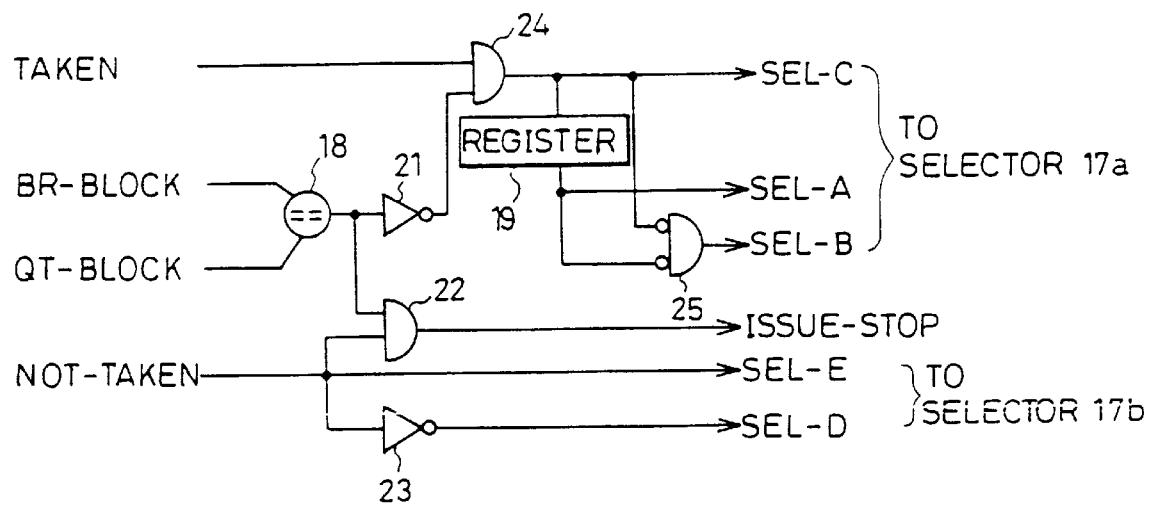

The structure of the pointer control portion is shown in FIGS. 20A and B. In FIGS. 20A and 20B, 16a denotes an adder for adding the output of a register 15 and the number 4, 16b denotes an adder for adding the output pointer scope of a register 14 and issued instruction information issue_count, 16c denotes an adder for adding the head address br_block ##0$^2$ of a block including a branch instruction (a block in a queue) and the number 8, 17a denotes a selector for selecting one of the output queue_top of register 15, the output of adder 16a, and the output of adder 16c, and writing the result of selection into register 15, 17b denotes a selector for selecting one of the output of adder 16b and the output of adder 16c, and writing the selected output into register 14, 18 denotes a comparator for comparing the pointer br_block and the pointer qt_block, 21 denotes an invertor for inverting the output of comparator 18, 22 denotes an AND circuit for producing the logical product of the output of comparator 18 and the signal Not Taken, 23 denotes an inverter for inverting the signal Not Taken, 24 denotes an AND circuit for producing the logical product of the output of inverter 21 and the signal Taken, 19 denotes a register for holding (delaying) the output of AND circuit 24 for 1 clock, and 25 denotes an NOR circuit for producing the negative logical sum of the output of AND circuit 24 and the data held in register 19.

An issuance inhibition signal issue_top is generated from AND circuit 22. Signals sel_c, sel_a and sel_b are signals for selecting corresponding inputs of selector 17a.

Signals sel_d and sel_e are signals for selecting corresponding inputs of selector 17b.

FIG. 21 shows the structure of issuance analysis section 10 shown in FIG. 5. In FIG. 21, instruction issuance analysis section 10 includes a hazard analysis portion 30, an issuance inhibition section 31 issuance number calculating section 32, and a gate 33 for controlling an availability signal inst_avail in accordance with the issuance inhibition signal issue_inhibit.

Hazard analysis section 30 analyzes hazard between instructions. Four instructions, instructions 1–4 are input into hazard analysis section 30. Among the input instructions, if the i-th instruction is free from any hazard, the i-th signal ia (availability signal) is turned on. "Hazard" indicates the state in which the value of a register (in a register file) to be used by an instruction is not determined. This analysis of hazard is conducted in accordance with the scoreboard of the register file (which will be later described).

Issuance inhibition section 31 receives the instructions 1–4, and produces a signal ignoring the less significant 2 bits of the address scope of a queue in which a branch instruction is stored, in other words produces a block address br_block for an instruction queue the branch instruction belongs to. Issuance inhibition section 31 also turns on a corresponding issuance inhibition signal issue_inhibit in order to inhibit issuance of an instruction which should be inhibited from being issued under any condition except for hazard. The issuance inhibition signal issue_inhibit is turned on by an issuance stop signal issue_stop transmitted from pointer control section 12, or is turned on for the instructions following a branch instruction when the signal Not Taken is on.

Gate 33 includes an inverter for inverting the issuance inhibition signal issue_inhibit from issuance inhibition section 31, and an AND circuit for receiving this inverter output and the signal ia from hazard analysis section 30. The inverter and AND circuit are provided correspondingly to instructions. The availability signals inst_avail are generated from gate 33 correspondingly to the instructions. More specifically, the signal inst_avail is the logical product of the signal ia and the signal/issue_inhibit (not issue inhibit).

Issuance number calculating section 32 receives the signals inst_avail from gate 33, calculates the number of instructions issued, and generates a signal issue_count indicating the number of issued instructions.

FIG. 22 is a logic diagram showing the issuance inhibition section shown in FIG. 21. In FIG. 22, a branch detection circuit 43 is provided correspondingly to each of the instructions 1–4. Branch detection circuit 43 detects whether or not an applied instruction is a branch instruction and turns on the output signal if the applied instruction is a branch instruction.

The output of branch detection circuit 43 is applied to a priority encoder 44. Priority encoder 44 detects the position of the branch instruction of the smallest address. A signal (2 bit data) indicating the position of the priority branch instruction is output from priority encoder 44. The output of priority encoder 44 is applied to adder 45. Adder 45 adds up the output of priority encoder 44 and the read pointer scope. The output of adder 45 indicates the address of the branch instruction in a queue. The output of adder 45 is applied to a less significant bit mask circuit 46. Less significant bit mask circuit 46 truncates the less significant 2 bits of the output (sets to "0"), and thus outputs a pointer br_block.

OR gates OR1–OR5 and AND gates AN1–AN3 are provided in order to control inhibition of issuance of instructions. If an instruction 1 is a branch instruction, one input of each of AND gates AN1–AN3 is pulled to "H". At this time, if the signal Not Taken attains "H", no branch is taken, and issuance of the instructions 2–4 is inhibited, resulting in the on state of the signal issue_inhibit. If the signal Not Taken is off, the issuance inhibition signal issue_inhibit to each of the instructions 2–4 is off, and, therefore, the instructions are issued. If any of the instructions 2–4 is a branch instruction, the position of the issuance inhibition signal issue_inhibit in each output portion is just shifted by 1. If the signal issue_stop is turned on, the instructions 1–4 are inhibited from being issued.

EMBODIMENT 2

In the above-stated embodiment 1, the instruction is prefetched in instruction queue 9. Now, a structure which use a usual instruction register and does not prefetch an instruction will be described.

FIG. 23 shows the essential structure of an instruction decode stage used in the second embodiment. In FIG. 23, the instruction decode stage includes an instruction register 54 for storing applied instructions (instructions 1–4), a branch processing section 11 for receiving an instruction from instruction register 54, detecting a branch instruction and determining whether or not a branch is taken, and an instruction issuance analysis section for receiving a signal Not Taken from branch processing section 11 and a instruction from instruction register 54 and analyzing the applied instruction as to whether or not the instruction: should be issued. In the structure shown in FIG. 23, with no instruction queue provided, a structure for controlling the pointer of an instruction queue is not provided. In the structure shown in FIG. 23, the definition of a branch delay slot is the same as that stated in the description of embodiment 1.

Figure 24A:
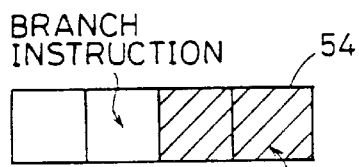

An operation of the instruction register when a branch is taken by a branch instruction is shown in FIG. 24. Among the instructions taken up into instruction register 54, consider that the second instruction is a branch instruction (FIG. 24A). In branch processing section 11, it is known that a branch is to be taken based on a execution of this branch instruction, the signal taken is turned on, and a branch target address is transmitted to the instruction memory. Instruction issuance analysis section 10 analyzes whether or not the instruction stored in instruction register 54 can be issued to a function unit, and turns on the signal inst_avail based on the result of the analysis. Assume that four instructions are issued.

Figure 24B:
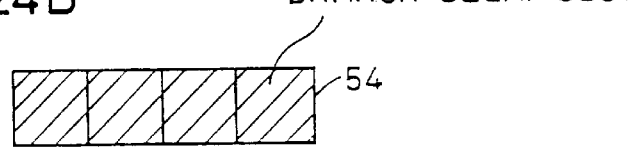
Figure 24C:
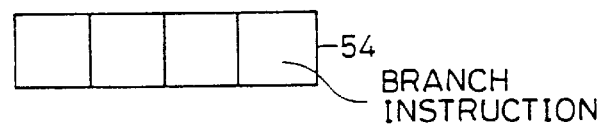

In the next cycle shown in FIG. 24B, instructions in a branch delay slot are fetched into instruction register 54. These instructions are dispatched to function units.

In the next cycle (FIG. 24C), a branch target side instruction applied from instruction memory is stored in register memory 54 and subsequently executed.

As the case of the structure shown in FIG. 24, using instructions on the side of branching as a branch delay slot, no deterioration in performance is caused due to a branch if the signal Taken is on when the branch is taken.

FIG. 25 is a representation showing an operation of an instruction register when a branch is not taken, in other words the signal Not Taken is on. Now, referring to FIG. 25, an operation of the instruction register when the signal Not Taken is on will be described.

Among the instructions taken up into register 54, assume that the second instruction is a branch instruction (FIG. 25A). Branch processing section 11 executes this branch instruction, knows that the signal Not Taken should be issued (should be turned on), and turns on the signal Not Taken, signaling instruction issuance analysis section 10. Instruction issuance analysis section 10 inhibits unconditionally issuance of instructions following the branch instruction.

In the next cycle (FIG. 25B), instructions in the branch delay slot are fetched to instruction register 54. In this cycle, issuance of instructions are inhibited.

In the next cycle (FIG. 25C), instructions next to the delay slot arrive, which are registered in instruction register 54, and are subsequently executed.

As shown in FIGS. 25A–C, if no branch is taken and the signal Not Taken is on, issuance of instructions is inhibited for 1 clock cycle, resulting in deterioration in performance. If this branch is not taken (the signal Not Taken is on) the following method by which two kinds of branch instructions as follows are prepared is employed in order to prevent this deterioration in performance. More specifically, these approaches are:

(a) to fill a branch delay slot with instructions on the side of branching (branch target side), and (b) to fill the branch delay slot with instructions on the side of not branching.

The former approach (a) is used in EMBODIMENT 1 and EMBODIMENT 2. The latter approach (b) is the same as the case in which a delayed branch method is not used. In other words the approach does not take advantage of a delayed branch method. The former approach (a) does not suffer from performance deterioration when a branch is taken, and is employed for a branch instruction with a high probability of branching. The latter approach (b) does not suffer from deterioration in performance when no branch is taken, and is employed for a branch instruction with a low probability of branching. In this case, an instruction register for receiving the output of instruction queue may be provided in an ID stage, or only the instruction queue may be used.

FIG. 26 shows one example of the structure of instruction issuance analysis section 10 shown in FIG. 23. The structure of the instruction issuance analysis section shown in FIG. 26 is similar to that shown in FIG. 21. However, issuance inhibition section 31 is provided with the signal Not Taken, and the issuance inhibition signal issue_stop through a register 35. Register 35 has a function of delaying the signal Not Taken for 1 clock cycle. The other structure is similar to that in FIG. 21. Since an instruction queue and/or an instruction register are used for issuance inhibition section 31 as is the case with the structure shown in FIG. 22, a priority encoder for detecting the priority branch instruction among instructions 1–4 and indicating its position is provided, and the structure of the less significant bit mask 46 and adder 45 are also used.

With issuance number calculating section 32 being provided, the issuance instruction number issue_count is generated. Instructions of addresses according to the number of issued instructions may be read out from the instruction memory without using the instruction queue. Also when the instruction register is used, a further instruction block may be taken up from the instruction memory after all the instructions stored in the register are issued.

EMBODIMENT 3

In the above EMBODIMENT 1 and EMBODIMENT 2, a branch instruction is processed in accordance with a delayed branch method, thus achieving a high speed processing. There is a method of branch prediction as one method of processing a branch instruction. According to the method of branch prediction, when a branch instruction exists, its branch direction is previously predicted, and a branch target instruction is executed based on the prediction. According to the branch prediction method, if a prediction is correct, time for fetching a target instruction is saved, and, therefore, deterioration in performance is reduced. Now, a description of a structure in accordance with this branch prediction method follows.

FIG. 27 schematically shows structures of an instruction fetch stage and an instruction decode stage associated with this third embodiment. In the following description of the third embodiment, four integer arithmetic operation units are considered as function units.

Instruction queue 9 prefetches instructions from the instruction memory and stores the prefetched instructions. Instruction queue 9 includes a register 14 for holding a read pointer scope, a register 15 for holding a write pointer queue_top, and a queue 13 for storing instructions as is the case with the first embodiment. Queue 13 stores, as one entry, an instruction, the address of the instruction (the address in the instruction memory), and a flag br_inv (which will be later described) indicating that the instruction is a branch instruction predicted.

An instruction decoder 66 decodes an instruction read out from instruction queue 9, and analyzes which instruction is issuable as is the case with the foregoing embodiments. The result of analysis is output as a flag indicating the availability of the instruction, an availability flag_inst_avail onto a signal line 91. In the structure shown in FIG. 27, four instructions are read out from instruction queue 9, and analysis of issuance as to these instructions is conducted in instruction decoder 66. Therefore, four bits of availability flags are provided, and if an instruction is issuable, a corresponding flag id_inst_avail is turned on in the flag id_inst_avail of 4 bits.

Instruction decoder 66 outputs the result of decode of the instruction, in other words an operation code onto a signal line 97 as a code ID_code. The operation code ID_code and the availability flag inst_avail of the instruction always proceed together in the function unit. Hereinafter EXC_code designates an operation code exiting in an execution stage EXC, while EXC_inst_avail represents the availability flag of an instruction in the execution stage EXC. The same designation is employed for a memory access stage MEM. Instruction decoder 66 further controls the values of pointer scope and queue_top of registers 14 and 15. The control will be later described.

In the structure shown in FIG. 27, the four instructions read out from instruction queue at a time are stored in instruction registers 65a–65d, respectively and applied to instruction decoder 66. Instruction registers 65a–65d each include an address storage region, an instruction code storage region, and a region storing a flag br_inv.

Instruction decoder 66 further controls the value of a program counter 12. An access to an instruction cache 61 is conducted in accordance with a pointer PC output from program counter 12, and the four instructions are simultaneously fetched from instruction cache 61.

Register file 69 is available for storing data and accessible from the instruction decode stage and function units.

A scoreboard control circuit 100 and a scoreboard circuit 101 are provided for monitoring the states of the registers in register file 69. The operations of the control circuit 100 and scoreboard circuit 101 will later be described in detail.

Execution of a branch instruction is conducted as follows.

Now, as an example of a branch instruction is considered: "when a register R1 indicates 0, a branch is made to an address produced by adding 5 to the address of the branch instruction (this "5" is called a branch offset).

(1) Test of branch conditions;

In instruction decoder 66, it is tested whether or not the content of register R1 read out from register file 69 is "0".

(2) Branch:

If the result of the test is "false", nothing is conducted. In other words, no branch is taken, and the next instruction to the branch instruction is executed. The result of the test is "true", 5 is added to the address of the branch instruction, and the result of the addition is set to the program counter 12 of instruction fetch stage (IF stage) in the next cycle.

The aforementioned is a general way of executing a branch instruction. Now, a description of execution of a branch instruction according to branch prediction follows. Execution of a branch instruction based on branch prediction is conducted as follows.

(1) Determination as to whether or not prediction branch is made. The following conditions are considered:
   IR1: R1←R2+R3
   IR2: IF R1==0 then PC←address+5
   IR3: instruction
   IR4: instruction The above instruction IR2 is a branch instruction described in the aforementioned example. The value of a register R1 necessary for this branch instruction is not decided until an addition instruction included in the instruction IR1 is complete. In such a case, the instruction IR2 is referred to as having a hazard. Therefore, in a conventional method of executing a branch instruction, the instruction IR2 enters the state of halting until the addition in the instruction IR1 is complete. According to a method of branch prediction, at this point, the branch instruction IR2 is predicted and it is decided that a branch will be taken. In subsequent cycles, instructions fetched based on the branch prediction will be executed.

In order to indicate execution of an instruction based on this branch prediction, the flag on_pred of register 63 is set to be on. Various methods are employed for predicting a branch. For example in the case of a method by means of branch offset, if a branch offset is a positive value, it is predicted that a branch is not taken, while if the branch offset is an negative value, it is predicted that a branch is taken.

(2) Branch: If a prediction indicates "a branch is not taken", nothing is going to happen and the instructions subsequent to the branch instruction are executed. If the prediction indicates "a branch is taken", 5 is added to the address of the branch instruction, and the resultant value is set to the program counter 12 of the instruction fetch stage IF in the next cycle.

(3) Setting of the flag br_inv:

The flag br_inv of the entry of instruction queue 9 in which the branch instruction IR2 is stored is set on. This indicates that the branch is under prediction. A branch address register 85 and a flag writing circuit 86 are provided for this purpose. Branch address register 85 stores the address br_add of a branch instruction in queue 13. Writing circuit 86 sets on the flag br_inv of an address specified by the address br_add in queue 13. In queue 13, simultaneous writing and reading of 4 instructions are executed. Therefore, a separate writing path may be provided for turning on or off only the flag br_inv of 1 bit. At that time, in writing circuit 86, a structure for making only a corresponding flag be 1 based on the address br_add and simultaneously writing the flag br_inv of 4 bits may be employed.

As described above, according to the branch prediction method in the third embodiment, the above mentioned steps (1) to (3) are executed. Now, execution of instructions after execution of a branch prediction will be described. Instructions to be executed after execution of a branch prediction are executed based on prediction, and, therefore, requires several mechanisms.

(1) Setting of a prediction flag inst_pred:

In order to indicate it is an instruction after a branch instruction subjected to branch prediction, the instruction to be issued to a function unit is provided with a flag inst_pred indicating that it is an instruction under branch prediction, and the flag is transmitted from instruction decoder 66 to a signal line 98. The flag inst_pred proceeds along with an operation code into the pipeline of the function unit. Instruction decoder 66 sets on a flag ID_inst_pred for an instruction after a branch instruction, when a flag on_pred is on.

(2) Non-execution of branch prediction instruction:

A branch instruction which has already undergone branch prediction, even if read out from instruction queue 9 once again and stored in instruction register 65, must not be executed, because its execution has already been completed. Therefore, the branch instruction which has undergone branch prediction is treated as an "NOP instruction" in instruction decoder 66. More specifically, the read out instruction with its flag br_inv being on is taken as the NOP instruction.

(3) Components of branch prediction instruction:

When the hazard of a branch instruction which has already underwent branch prediction has not yet disappeared, and an instruction (of a large address) further subsequent to the branch instruction is issued, the branch instruction is saved so that the direction of branch can later be decided when the hazard of the branch instruction disappears. Therefore, the branch instruction is stored in a control circuit 62 as an instruction br_save. Control circuit 62 stores the branch instruction which underwent branch prediction, and also has a function of testing and determining branch as is the case with decoder 66. For example, if a branch instruction indicates that a branch should be taken when the value of a register R5 in register file 69 is 0, control circuit 62 stores the branch instruction as an instruction br_save, and observes the data of register R5 in register file 69 and if the value of register R5 is decided, tests the branch instruction using the value of register R5.

(4) Deciding the direction of branch decided based on prediction and canceling pipeline:

When the hazard of a branch instruction under branch prediction disappears, a branch direction can be decided. Different controls will be made based on whether or not the branch direction matches the branch taken based on the prediction.

(a) If the prediction was right:

In that case, instruction decoder 66 outputs a signal pred_hit indicating that the branch prediction was correct. The flag inst_pred of each of the pipeline stages of a function unit is turned off.

(b) When the prediction wasn't right:

In that case, instruction decoder 66 outputs a signal pred_mis indicating that the branch prediction was incorrect to each function unit. In each of pipeline stages of the function unit, an instruction with the flag inst_pred being on is invalidated. More specifically, the flag inst_avail is turned off. Turning off the flag inst_avail inhibits writing by an instruction into the register file in a write back stage WB. Also, in an instruction of storing data into the data memory, storing operation of data into the data memory in this memory access stage is inhibited.

Summarizing the above process in an logical expression, the availability flag output EXC_inst_avail_out from the execution stage EXC and the branch prediction execution flag output EXC_pred_inst_out from the execution stage EXC are expressed as follows:

EXC_inst_avail_out=(/EXC_inst_pred+EXC_inst_pred*(pred_hit+/pred_hit*/pred_mis))*EXC_inst_avail, EXC_inst_pred_out=EXC_inst_pred */pred*/pred_hit FIG. 28 is a logic diagram showing a circuit configuration which implements the above expression. In FIG. 28, a structure for controlling the value of each flag when an instruction is transferred from the execution stage EXC to memory access stage MEM is shown. A block shown by a broken line in this execution stage EXC is similarly used in the memory access stage MEM. In the structure of each circuit, the operation "+" in the above logic expression is implemented by an OR circuit, the operation "*" is implemented by an AND gate, and the operation "/" is implemented by an inverter.

Instead of the structure shown in FIG. 28, as shown in FIG. 29, a structure may be employed in which the signals pred_mis and pred_hit are applied commonly to each of the stages, and resetting of a latch circuit in each of the stages (invalidating a flag) is executed.

The characters LA in FIG. 29 represents a latch circuit for latching a signal applied in response to a clock signal which clocks a pipeline operation.

When a branch direction is decided, the flag on_pred of register 63 (see FIG. 27) is turned off, indicating the completion of execution of the branch prediction.

In the above description, branch prediction to a usual branch instruction has been considered. Among branch instructions, there exists an instruction which also has the function of a special operation named linkage. Such an instruction is referred to as a jal herein. The jal instruction is described as:

jal target

The jal instruction unconditionally sets a branch target address "target" to program counter 63 and jumps, and also writes the address of itself in a specified register.

The jal instruction is provided with a function of rewriting the content of a register, besides the function of taking a branch which has been described. In the case of branch prediction, an instruction itself is executed even if instructions preceding to the instruction can not be issued. If the jal instruction conducts a similar operation, rewriting of the content of a register is executed, because execution of the preceding instructions is not complete. Such replacing the order of rewriting into the register makes interruption processing extremely difficult. Therefore, in the case of the jal instruction, only rewriting of the value of the pointer PC of program counter 62 is executed in branch prediction execution. An operation of linkage is to be issued when all the instructions preceding to the instruction jal are issued. More specifically, the jal instruction can take a branch based on a branch prediction, but linkage is not conducted at the time of the branch execution. The jal instruction with the flag br_inv being on does not take a branch, but issues the operation of linkage when a hazard disappears with all the preceding instructions having been issued.

A description of scoreboarding for implementing this method of branch prediction follows. Consider the order of instructions as follows:

IR1: R1←M (R2)
IR2: R3←R1+R4

The instruction IR1 accesses the data memory using the content of register R2 as an address, and stores the data of the accessed data memory into register R1. The instruction IR2 adds up the contents of register R1 and register R4, and writes the result of addition into register R3. The second instruction IR2 uses the result R1 of the first instruction IR1. Therefore, the second instruction IR2 can not be issued until reading operation of the data memory by the first instruction IR1 is complete. Therefore, a mechanism for indicating that the content of instruction register R1 is not decided and making such a control to inhibit other instructions from using incorrectly register R1 will be necessary.

If register file 69 is formed of 32 words, a flag is provided to each word. When the flag is on, it indicates that the content of a corresponding register is not decided. This flag is called a scoreboard. The scoreboard is expressed as RF_lkf<31:0>.

In the case of the above-stated instructions IR1 and IR2, the first instruction IR1 is to rewrite the content of register R1 when being issued. At that time, a 1 bit flag RE_lkf<1> is set on. If data is read out from the data memory, the flag RF_lkf<1> is turned off.

In addition to the flag RF_lkf, further provided in the present embodiment is a flag RF_lkf_pred<31:0> indicating that the instruction which has turned on the flag of the scoreboard corresponding to each of the registers is an instruction undergoing branch prediction.

An instruction for making a control for waiting the content of register to be decided using the scoreboard (designated by the reference numeral 101 in FIG. 27) is assumed to be herein only a "load memory" accessing the data memory. In this case, in scoreboard circuit 101, the bits of the flag RF_lkf corresponding to the write register are turned on when a load instruction is issued. If issuance of the load instruction is an execution after a branch prediction (the flag on_pred is on), the flag RF_lkf_pred corresponding to the register to be written is turned on.

When the branch prediction turns out to be incorrect, the flag RF_lkf_pred turns off the flag RF_lkf corresponding to the on bit. Furthermore, the flag RF_lkf_pred for each register is turned off.

A description of a logic circuit of a scoreboard control circuit 101 for controlling the scoreboard follows. Instruction decoder 66 turns on a signal issue_load when it issues a load instruction. The memory access stage MEM of a load/store unit turns on a signal MEM_load complete when it can read data from a data cache (data memory). Each of the bits of the scoreboard RF_lkf is provided with a write enable signal RF_lkf_we<31:0>. Writing into a register takes place only when the write enable signal is on. Similarly, the write enable signal RF_lkf_pred_we<31:0> is provided to the flag RF_lkf_pred. Furthermore, when the signal RF_lkf_pred_reset is turned on, all the flags of scoreboard RF_lkf_pred for prediction are turned on.

In the above described logic, control of the scoreboard RF_lkf and RF_lkf_pred can be expressed by a truth table shown in FIG. 30. Expressing the truth table shown in FIG. 3 in a logic circuit provides a circuit configuration shown in FIG. 31. In the configuration shown in FIG. 31, only a control portion corresponding to one register file is shown by way of illustration. A decoder 14 decodes a write register signal (5 bits) and selects one of output signal lines (32 output signal lines all together provided corresponding to write registers). The logical product of the output of decoder 140 and the signal issue_load is produced. Data is written into registers 141 and 142, in response to write enable signals RF_lkf_we<i> and RF_lkf_pred_we<i>, respectively. The outputs of registers 141 and 142 are transferred to instruction decoder 166.

A functional structure of instruction decoder 66 is shown in FIG. 32. In FIG. 32, an instruction decode circuit 160 decodes four instructions, instructions #1–#4, and issues an operation code ID_code. An issuance analysis section 161 receives these instructions #1–#4 and a flag br_inv, analyzes whether or not the instructions are issuable and issues an issuability flag ID_inst_avail.

A branch processing section 164 receives the instructions #1–#4, detects a branch instruction, and executes the branch instruction. If the branch instruction can not be executed in the cycle, branch processing section 164 issues a flag pr_ex indicating that a branch prediction is going on. Branch processing section 164 also generates signals Taken and Not Taken respectively showing the presence and absence of a branch when execution of the branch instruction is completed.

A register 163 receives the signal pr_ex from branch processing section 164, and stores the same as a flag on_pred.

A prediction flag generation circuit 162 receives the flag br_inv, the signals Taken and Not Taken, and the flag on_pred from branch processing section 164, and generates a prediction flag ID_inst_pred. The signals Taken and Not Taken from branch processing section 164 are applied to issuance analysis section 161. The operation of each of the circuits is the same as the one in the aforementioned signal generation method, and the description will not be repeated.

Although in the above embodiment, the number of instructions to be fetched at the time is 4, and the number of instructions to be analyzed at a time is four, the number of instruction is not limited to 4, and may be other numbers.

POST SUMMARY

The feature of the first aspect of the present invention will be summarized as follows.

(1) Among a plurality of instructions including a branch instruction, instructions from an instruction one address after the branch instruction to an instruction fetched last in the cycles necessary for the branch instruction to be fetched and executed constitute a branch delay slot.

(2) The branch delay slot is filled with instructions from an instruction of a branch target address to be executed when a branch is taken due to a branch instruction associated with the branch delay slot to an instruction one address before a branch instruction to be executed next.

(3) In the cycle in which instructions are prefetched from an instruction memory and stored in a queue memory, and a branch instruction is executed, it is determined whether or not the branch delay slot of the branch instruction has already been stored in the queue memory, and based on the result of the determination, the write addresses and read addresses of the queue memory, and information on whether or not a branch is taken obtained from the result of the execution of the branch instruction, the write addresses and read addresses of the queue memory are controlled.

(4) When a branch instruction is executed, and it is decided that a branch is taken as a result, if all of the instructions in the branch delay slot of the branch instruction have not yet been stored in the queue memory, the write address of the queue is set to be an address produced by adding the number of fetched instruction to the present value.

(5) When a branch instruction is executed and it is decided that a branch is taken as a result, if all the instructions of the branch delay slot of the branch instruction have been stored in the queue memory, the write address of the queue memory is set to be an address next to the queue address in which the instruction of the last address of the branch delay slot is stored.

(6) When a branch instruction is executed and it is decided that a branch is taken as a result, the read address of the queue memory is increased by the number of instructions issued to function units.

(7) When a branch instruction is executed, and it is decided that a branch is not taken as a result, issuance of an instruction after the branch instruction which is to be issued to the function unit is stopped.

(8) When a branch instruction is executed, and it is decided that a branch is not taken as a result, the read address of the queue memory is set to be an address next to the address of the queue memory in which the instruction of the last address of the branch delay slot is stored or is to be stored.

(9) When a branch instruction is executed and it is decided that a branch is not taken as a result, if all the instructions of the branch delay slot of the branch instruction have not yet stored in the queue memory, issuance of an instruction is stopped until all the instructions of the branch delay slot are stored.

The feature of the second aspect of the present invention is as follows.

(1) A plurality of instructions are prefetched from an instruction memory, and a queue memory for storing the prefetched instructions is provided. The queue memory includes a plurality of entries, in each of which one instruction is stored. The entry includes a field indicating that the stored instruction has already been executed based on a branch prediction.

(2) Based on the value of the field indicating the execution based on the prediction, control is made so that the instruction stored in the corresponding entry will not be executed.

(3) An instruction by which storing of a return address into the register of a register file and branching are simultaneously conducted is executed based on a branch prediction, only the branching is conducted, and the storing of the return address into the register will be executed when the instruction becomes executable.

(4) Instructions each in a function unit (a pipeline) have a first flag (inst_pred) indicating that the instruction is issued in a period before it is decided whether the prediction is correct or not after conducting a branch prediction, and a second flag (inst_avail) indicating that the instruction is available. If the branch prediction turns out to be correct, the first flag (inst_pred) is turned off, while if the prediction turns out to be incorrect, the second flag of an instruction with the first flag being on is turned off, and the first flag is turned off.

(5) A register file (a general purpose register) is provided with a third flag (RF_lkf) indicating that writing is to take place to the register, and a fourth flag (RF_lkf_pred) indicating the instruction which controls the flag is issued in the period after a branch prediction and before it is decided whether the prediction is correct or not. If the prediction is correct, the fourth flags of all the general purpose registers are reset. When the prediction turns out to be incorrect, the third flag of a register whose fourth flag is on is turned off.

According to the present invention, with a delayed branch slot associated with a branch instruction being filled with instructions on the side of branching, deterioration in performance due to execution of the branch instruction can be prevented regardless whether a branch is taken or not.

Furthermore, instructions are prefetched from an instruction memory and stored in a queue memory, a write pointer and a read pointer to queue when a branch instruction is executed are always controlled in such a manner that no empty stage is created in a pipeline, and deterioration in performance due to execution of the branch instruction can efficiently and surely prevented.

Furthermore, in a structure in which instructions are not prefetched, when a branch is taken by a branch instruction, filling a branch delay slot with branch target side instructions prevents deterioration in performance by the branch instruction.

According to the present invention, a branch instruction is executed based on a branch prediction before a hazard disappears. Therefore, in the case of branching, the cycle waiting for a branch target instruction to arrive from an instruction cache which is conventionally necessary will be unnecessary, a target instruction is previously fetched based on a prediction, the cycle for waiting for the target instruction to arrive from the instruction cache will not be necessary, whereby no empty stages are created in a pipeline. Thus, deterioration in performance of a parallel processing unit due to a branch instruction can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel processing unit including an instruction memory for storing instructions and a plurality of function units operable in parallel for executing instructions, comprising:

fetching means responsive to an address for fetching a plurality of instructions at a time from said instruction memory;

detecting means for detecting a branch instruction among the plurality of instructions fetched; and forming means responsive to the detecting means for forming a branch delay slot including all of instructions fetched during a period from fetching the branch instruction to execution of the branch instruction, the instructions in the branch delay slot being subsequent to the branch instruction in an instruction sequence, wherein said forming means includes:
storage means for storing instructions fetched from said instruction memory,
write pointer means for generating a write pointer indicating an address of said storage unit at which fetched instructions are stored,
a read pointer means for generating a read pointer indicating an address of said storage means at which instructions are read out,
determination means, responsive to said detecting means, for determining whether any branch delay slot for the branch instruction is already stored in the storage means,
decision means for deciding whether a branch by the branch instruction is taken, and
control means, responsive to the write pointer, read pointer, said determination means, and said decision means, for controlling the write pointer from the write pointer means and the read pointer from the read pointer means.

2. A parallel processing unit according to claim 1, wherein said control means includes means for adjusting the write pointer to a value of a sum of a current value of the write pointer and the number of fetched instructions from said instruction memory, when said determination means determines that the branch delay slot for the branch instruction has not been filled with instructions subsequent to the branch instruction and when said decision means decides that the branch is taken.

3. A parallel processing unit according to claim 1, wherein said control means includes means for adjusting the write pointer to a value of an address very next to a last address of the branch delay slot, when said determination means determines that the branch delay slot has been filed with instructions subsequent to the branch instruction, and when said decision means decides that the branch is taken.

4. A parallel processing unit according to claim 1, wherein said control means includes means for adjusting the read pointer to a value increased by the number of instructions dispatched into function units of said plurality of function units, when said decision means decides that the branch is taken.

5. A parallel processing unit according to claim 1, wherein said control means further includes means for stopping dispatching of instructions subsequent to the branch instruction, when said decision means decides that no branch is taken by the branch instruction.

6. A parallel processing unit according to claim 1, wherein said control mean includes means for adjusting the read pointer to a value of an address next to the last address for the branch delay slot, when said decision means decides that no branch is taken.

7. A parallel processing unit according to claim 1, wherein said control means further includes means for stopping issuance of an instruction to a function unit, when said determination means determines that all instructions for the branch delay slot are not stored in said storage unit and when said decision means decides that no branch is taken by the branch instruction.

8. A parallel processing unit according to claim 1, wherein said storage means comprises a queue memory.

9. A parallel processing unit including a plurality of function units operable in parallel for executing instructions and an instruction memory for storing instructions, comprising:

storage means for storing instructions fetched from said instruction memory, said storage means including a plurality of entries, each of said entries including a first field for an instruction and a second field for storing a flag indicating that the instruction linked with said flag is executed under a prediction of branch;

predict means for detecting a branch instruction among instructions read out from said storage means and for predicting whether a branch is taken by the branch instruction;

setting means responsive to said predict means, for establishing a value of the flag in said second field; and control means, response to a value of the flag, for controlling execution and non-execution of the instruction linked with said flag.

10. A parallel processing unit according to claim 9, wherein said control means includes means for inhibiting execution of the instruction linked with said flag when the flag indicates that the instruction linked with said flag is executed according to a predicted branch provided by said predict means.

11. A parallel processing unit according to claim 9, further comprising a register file including a plurality of registers, and wherein said control means includes means for storing a return address in one of the plurality of registers of said register file when the branch instruction can actually be executed if the branch instruction includes an instruction for storing t he return address required for returning from a taken branch in the register.

12. A parallel processing unit including a plurality of function units operable in parallel for executing instructions and an instruction memory for storing instructions, comprising:

storage means for storing instructions fetched from said instruction memory, said storage means including a plurality of entries, each of said entries including a first field for an instruction and a second field for storing a flag indicating that an associated instruction is executed under a prediction of branch;

predict means for detecting a branch instruction among instructions read out from said storage means and for predicting whether a branch is taken by the branch instruction;

setting means, responsive to said predict means, for establishing a value of the flag in said second field; and control means, responsive to a value of the flag, for controlling execution and non-execution of an associated instruction, wherein said control means includes;

dispatch means receiving a plurality of instructions from said storage means, detecting simultaneously executable instructions out of the received instructions, and dispatching the simultaneously executable instructions to related function units, predict verify means for executing the branch instruction and determining whether prediction of the branch is correct, first flag generating means, responsive to said predict means and predict verify means, for generating a second flag for each instruction indicating that an associated instruction is to be dispatched to a related function unit in a period after prediction of a branch is made before the determination by said predict verify means, second flag generating means for generating a third flag for each instruction indicating that an associated instruction is valid to be executed in a function unit, the second and third flags and the associated instruction being issued into a related function in a linkage manner, and flag control means, responsive to said predict verify means, for controlling a value of the second and third flags dispatched into a function unit, said flag control means making only the second flag inactive when the predict verify means indicates that the prediction of a branch is correct, while making both the second and third flags inactive for an instruction having a second flag active when the predict verify means indicates that the prediction is incorrect.

13. A parallel processing unit including a plurality of function units operable in parallel for executing instructions and an instruction memory for storing instructions, comprising:

storage means for storing instructions fetched from said instruction memory, said storage means including a plurality of entries, each of said entries including a first field for an instruction and a second field for storing a flag indicating that an associated instruction is executed under a prediction of branch;

predict means for detecting a branch instruction among instructions read out from said storage means and for predicting whether a branch is taken by the branch instruction;

setting means responsive to said predict means, for establishing a value of the flag in said second field; and control means, responsive to a value of the flag, for controlling execution and non-execution of an associated instruction, further comprising a register file including a plurality of registers, and wherein said control means includes:

detecting means for detecting an instruction requiring writing of data into a register of said register file, first flag storage means provided for each said register and responsive to said detecting means for storing a first flag indicating that an associated register is to be subject to data writing, second flag storage means provided for each said register and responsive to said predict means, for storing a second flag indicating that the instruction requiring writing of data is an instruction dispatched after the prediction of a branch is made before the prediction is determined to be correct or incorrect, and flag control means, responsive to said detecting means and said predict means, for controlling the second and third flags, said flag control means making all the third flags inactive when the prediction is determined to be correct, while making the second flag inactive for a register having the third flag active when the prediction is determined to be incorrect, an active third flag indicating that the content of an associated register is unavailable.

14. A parallel processing system for pipeline processing of instructions including a branch instruction, each instruction being processed in a plurality of stages and a determination of either to branch or not to branch being found at a predetermined one of said stages, comprising:

an instruction memory for storing said instructions;

means for compiling an application program and providing the instructions to be stored in the instruction memory;

fetching means for providing an address and fetching a plurality of instructions at a time from said instruction memory, said plurality of instructions fetched at a time being an instruction block;

decoder means for decoding said plurality of instructions fetched at a time and determining instructions to be executed in parallel; and a plurality of function units for executing instructions provided by the decoder means including the instructions determined to be executed in parallel, said means for compiling including
means for detecting a branch instruction, and
forming means responsive to the detected branch instruction for forming a branch delay slot, said branch delay slot being an address range starting from an address immediately subsequent to the detected branch instruction to a last address of the instruction block fetched during said predetermined operation cycles which occur until determination of the branch result for the detected branch instruction, and said branch delay slot including a variable number of instructions and said instructions are only to be executed when a branch by the branch instruction is taken.

15. A parallel processing unit according to claim 12, wherein said forming means includes a storage unit including a plurality of blocks of storage for sequentially storing instructions fetched in parallel from said instruction memory, the branch delay slot including instructions stored in a common block with the branch instruction and in a block adjacent in a downstream to said common block.

16. A parallel processing unit according to claim 12, wherein the branch delay slot includes instructions of an instruction at a branch target address to be executed when a branch is taken by the branch instruction through an instruction immediately before a next branch instruction in an instruction sequence.

17. A parallel processing unit according to claim 12, wherein said forming means includes storage means for queuing instructions fetched from said instruction memory.

18. A parallel processing unit according to claim 12, wherein said forming means includes a plurality of instruction registers for storing in parallel the plurality of instructions fetched from said instruction memory.

19. A parallel processing unit according to claim 18, wherein the branch delay slot is formed by instructions fetched simultaneously with and subsequently to the branch instruction, and instructions immediately subsequently fetched from said instruction memory and stored in said plurality of instruction registers at a time.

20. A parallel processing unit according to claim 12, wherein said storage means includes a queue memory.

21. A parallel processing unit comprising:

and instruction memory for storing an instruction sequence having a plurality of instruction blocks, each of said instruction blocks including a plurality of instructions sequential in said instruction sequence;

an instruction fetch unit for providing addresses for said instruction memory and fetching the instruction blocks from said instruction memory sequentially, the plurality of instructions included in each instruction block being fetched in parallel, and a branch instruction included in a first instruction block of said plurality of instruction blocks;

an instruction issuance analysis unit inputting a plurality of instructions from said instruction fetch unit in parallel, for issuing instructions to be executed in parallel among the instructions inputted in parallel; and a plurality of function units for executing instructions issued by said instruction issuance analysis unit in parallel;

a branch delay slot for said branch instruction being formed of a plurality of instructions stored in an address range of said instruction memory, the address range including sequential addresses starting from an address which accesses an instruction immediately subsequent to said branch instruction to a last address of a second instruction block of the instruction blocks immediately subsequent to said first instruction block in said instruction sequence, and said plurality of instructions of said branch delay slot being executed in said plurality of function units only when a branch by said branch instruction is taken.

22. The parallel processing unit according to claim 21, further comprising:

a branch processing unit receiving a plurality of instructions from said instruction fetch unit in parallel, for detecting said branch instruction and determining whether a branch by said branch instruction is taken, wherein said instruction issuance analysis unit is responsive to said branch processing unit, for inhibiting the instructions of said branch delay slot from being issued to said plurality of function units when it is determined that a branch by said branch instruction is not taken.

23. The parallel processing unit according to claim 21, wherein said instruction fetch unit includes a queue having a plurality of storage units, each of said plurality of storage units addressed by a queue address and storing an instruction fetched from said instruction memory, and wherein a plurality of storage units are grouped into a plurality of storage blocks, the instructions included in said first instruction block written into one of said plurality of storage blocks in parallel, while the instructions included in said second instruction block are written into another one of said plurality of storage blocks in parallel, and the storage units for said first and second instruction blocks are addressed by sequential queue addresses.

24. The parallel processing unit according to claim 23, further comprising:

a branch processing unit receiving a plurality of instructions from said instruction queue, for detecting said branch instruction and determining whether a branch by said branch instruction is taken, wherein said instruction fetch unit further includes:
- a write pointer for indicating a head address of one of said plurality of storage blocks, instructions included in one of the instruction blocks being written into storage units included in the storage block having said head address in parallel;
- a read pointer for indicating a read address of one of said plurality of storage units, instructions stored in storage units from a storage unit having said read address to a storage unit having an address being said read address plus a predetermined number being read out into said instruction issuance analysis unit; and
- a control unit responsive to said branch processing unit, for controlling said write pointer to set a value of the head address and controlling said read pointer to set a value of the read address.

25. The parallel processing unit according to claim 21, wherein said instruction fetch unit includes an instruction register for storing in parallel the instructions fetched from said instruction memory, said instruction register storing in parallel the instructions of said first instruction block including said branch instruction in a first period, and storing in parallel the instructions of said second instruction block in a second period following said first period.

* * * * *